United States Patent
Nakamura et al.

(10) Patent No.: US 8,758,901 B2
(45) Date of Patent: Jun. 24, 2014

(54) ULTRAHIGH-STRENGTH WELDED JOINT AND PRODUCTION METHOD THEREOF

(75) Inventors: Shuichi Nakamura, Tokyo (JP); Kazuhiro Kojima, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/701,869

(22) PCT Filed: Jun. 6, 2011

(86) PCT No.: PCT/JP2011/063425
§ 371 (c)(1),
(2), (4) Date: Dec. 4, 2012

(87) PCT Pub. No.: WO2011/155620
PCT Pub. Date: Dec. 15, 2011

(65) Prior Publication Data
US 2013/0078031 A1    Mar. 28, 2013

(30) Foreign Application Priority Data
Jun. 7, 2010 (JP) .................................. 2010-130415

(51) Int. Cl.
C22C 38/02 (2006.01)
C22C 38/58 (2006.01)

(52) U.S. Cl.
USPC .......................................................... 428/655

(58) Field of Classification Search
None
See application file for complete search history.

(56) References Cited

U.S. PATENT DOCUMENTS 4,175,227 A * 11/1979 Kasper ..................... 219/125.12
2005/0155960 A1    7/2005 Bonnet

FOREIGN PATENT DOCUMENTS

| EP | 0 867 520 | 9/1998 |
| JP | 10-324950 | 12/1998 |
| JP | 2002-121642 | 4/2002 |
| JP | 2008-023569 | 2/2008 |
| JP | 2008-248315 | 10/2008 |

OTHER PUBLICATIONS

English machine translation of JP10-324950 dated Jun. 4, 2013.*
International Search Report dated Sep. 6, 2011, issued in corresponding PCT Application No. PCT/JP2011/063425.

(Continued)

Primary Examiner — Humera Sheikh
Assistant Examiner — Adam Krupicka
(74) Attorney, Agent, or Firm — Kenyon & Kenyon LLP

(57) ABSTRACT

An ultrahigh-strength welded joint with superior strength and toughness, and a method for producing the ultrahigh-strength welded joint by means of single-pass welding by using laser hybrid welding, are provided, wherein the welded joint comprising a steel plate having a plate thickness of 4 mm to 12 mm and including weld metal of almost full martensite structure, wherein, in a cross-section of the welded joint in a direction perpendicular to a welding direction, a cross-sectional shape of the weld metal has a width W1 of 2.0 to 7.0 mm at a surface of the steel plate and a width W2 of 0.5 to 2.4 mm at a position where is separated from the surface by three-quarters of the plate thickness, wherein the weld metal comprises, by mass %, C: over 0.09% to 0.24%; Si: 0.2% to 1.0%; Mn: 0.5% to 2.5%; P: 0.02% or less; S: 0.02% or less; Al: 0.004% to 0.08%; Ti: 0.005% to 0.15%; O: 0.005% to 0.05%; and Ni: 1.0% to 9%, and wherein a carbon equivalent (Ceq) is 0.40% to 1.00%, a value Y as defined by equation ((([Si]+[Mn])/40+[Al]+[Ti]) is 0.07% to 0.20%.

5 Claims, 3 Drawing Sheets

$2 \text{ mm} \leqq W1 \leqq 7 \text{ mm}$ $0.5 \text{ mm} \leqq W2 \leqq 2.4 \text{ mm}$

(56) References Cited

OTHER PUBLICATIONS

Extended European Search Report dated Dec. 17, 2013 issued in corresponding EP Application No. 11 79 2577.

*Method for Charpy pendulum impact test of metallic materials*: Annex D, Japanese Industrial Standard, JIS Z 2242 : 2005 (E), with an English translation thereof.

* cited by examiner $2 \text{ mm} \leqq W1 \leqq 7 \text{ mm}$ $0.5 \text{ mm} \leqq W2 \leqq 2.4 \text{ mm}$

ULTRAHIGH-STRENGTH WELDED JOINT AND PRODUCTION METHOD THEREOF

This application is a national stage application of International Application No. PCT/JP2011/063425, filed Jun. 6, 2011, which claims priority to Japanese Application No. 2010-130415, filed Jun. 7, 2010, the content of which is incorporated by reference in its entirety.

TECHNICAL FIELD

The present invention relates to an ultrahigh-strength welded joint and a production thereof, the welded joint being obtained by single-pass welding of a steel plate having a tensile strength of 1100 MPa or more and a plate thickness of 4 mm to 12 mm, by using laser hybrid welding wherein a laser beam and gas shielded arc welding are combined. The ultrahigh-strength welded joint has superior strength and toughness, which can also absorb energy in 2 mm V-notch Charpy impact test at −40 degrees C. (vE-40) of the ultrahigh-strength welded joint which is equal to or more than 27 J/cm$^2$, whereby the ultrahigh-strength welded joint is advantageously used for a construction machine or an industrial machine, etc.

BACKGROUND ART

In recent years, there is an increasing need for large and high-rise buildings, and a construction machine or industrial machine, such as a crane used for construction, must be large and have high-performance, in order to shorten construction time and reduce construction cost. Therefore, the strength of a steel plate used for the construction machine or the industrial machine has been increased, and, an ultrahigh-strength steel plate, having the tensile strength more than 1100 MPa, is currently being.

In the prior art, when welding a steel plate, manual metal arc welding, gas shielded arc welding or submerged arc welding, etc., has been used. However, in recent years, in order to improve the efficiency of the welding of the steel plate, the use of laser hybrid welding, wherein a laser beam and gas shielded arc welding are combined, has been considered.

As a method for the laser hybrid welding, a method wherein a pool is formed by the gas shielded arc welding and the laser is irradiated on the pool, or, a method wherein the laser is irradiated on the steel plate so that the steel plate is melted by high-density heat input and the gas shielded arc welding is performed thereon, may be possible.

When the laser hybrid welding is used to weld the steel plate, a deeper weld penetration is obtained in comparison to the conventional welding. Therefore, in the laser hybrid welding, the single pass welding can be performed when the thickness of the steel plate is not more than 12 mm, whereby the steel plate may be welded effectively.

As a method for welding the steel plate by using the laser hybrid welding, techniques of Patent Literatures 1 and 2 have been proposed.

PLT 1 discloses a method for producing an ultrahigh-strength welded steel pipe including the steps of: providing a steel plate having a tensile strength over 800 MPa, which has a microstructure corresponding to a mixed structure of ferrite, plus tempered martensite and lower bainite; forming the steel plate into a piped-shape; and welding butted parts by laser hybrid welding.

Further, PLT 2 discloses a method for producing an ultrahigh-strength and highly-deformable welded steel pipe including the steps of: providing a steel plate having a tensile strength over 900 MPa, which has (ferrite plus bainite), (ferrite plus martensite) and (ferrite plus bainite plus martensite), one of which having an area fraction equal to or more than 90%; forming the steel plate into a pipe-shape; and welding butted parts by laser hybrid welding.

CITATION LIST

Patent Literature

PLT 1: Japanese Patent Publication (A) No. 2008-23569
PLT 2: Japanese Patent Publication (A) No. 2008-248315

SUMMARY OF INVENTION

Technical Problem

In order to effectively weld the steel plates each having the thickness of 4 mm to 12 mm, it is preferable to single-pass weld by using the laser hybrid welding, wherein the laser beam and the gas shielded arc welding are combined.

When the thickness of the steel plate is equal to or more than 4 mm, the toughness is also required as well as the tensile strength. In particular, a welded joint, used for the construction machine or industrial machine, is often required to have the absorbed energy in 2 mm V-notch Charpy impact test at −40 degrees C. (vE-40) of 27 J/cm$^2$ or more. Therefore, the laser hybrid welding has been applied to the steel plate which has the thickness of 4 mm or more and the tensile strength of 1050 Mpa or less. In other words, there is no precedent for the application of the laser hybrid welding to the ultrahigh-strength steel having a tensile strength of 1100 MPa or more.

When the steel having the tensile strength of 1100 MPa or more is welded by the laser hybrid welding, the weld metal microstructure becomes almost full martensite. Further, since the welding is the single-pass welding, the weld metal is as welded and is never reheated by subsequent welding passes. Thus, the toughness of the weld metal is not improved by the reheating, and that makes it difficult to ensure sufficient toughness of the weld metal. Therefore, even if the steel plate having the tensile strength of 1100 MPa or more is welded by the laser hybrid welding, a technique that satisfies the strength and toughness of the weld metal is required.

The present invention was made in consideration of the above problems and has as its object the provision of a weld metal and a welded joint which satisfies the tensile strength and toughness, even the steel plate having the thickness of 4 mm to 12 mm and the tensile strength of 1100 MPa or more is welded by the single-pass welding by using the laser hybrid welding, wherein the laser beam and the gas shielded arc welding are combined.

Solution to Problem

In welding the steel plate having the thickness of 4 mm to 12 mm or more and the tensile strength of 1100 MPa or more, in order to ensure sufficient tensile strength of the welded joint, it is necessary that the structure of the weld metal be almost full martensite.

In welding using the laser beam only, the microstructure of the weld metal is still as welded, and it is difficult to ensure sufficient toughness since a block size or a packet size of the martensite becomes coarse. On the other hand, in the single-pass gas shielded arc welding only, since high heat input is necessary, a cooling rate is lowered. As a result, it is difficult to ensure sufficient tensile strength of the weld metal and the entire welded joint.

Then, the inventors recognized the laser hybrid welding, wherein the laser beam and the gas shielded arc welding are combined. In the laser hybrid welding, the weld metal containing oxygen is formed by the gas shielded arc welding. Then, a deeper weld penetration is formed with low input heat by using the laser beam, whereby the welding can be performed with extremely high cooling rate in comparison to the conventional gas shielded arc welding. By virtue of this, fine oxides may be dispersed and crystallized in the weld metal, and the microstructure (or the block and/or packet) of the martensite becomes fine, whereby sufficient toughness can be ensured even if the structure of the weld metal is almost full martensite.

The inventors investigated an optimum composition of the weld metal, in relation to the weld metal and the welded joint obtained by the single-pass welding using the laser hybrid welding, wherein the weld metal having superior tensile strength and toughness may be obtained by dispersing and crystallizing fine oxides in the weld metal while ensuring hardenability for obtaining the strength. As a result, the inventors found that the microstructure of the weld metal may be almost full martensite by limiting each content of C, Si, Mn, Ni, Cr, Mo, V, Nb and B to within a certain range, respectively, and that appropriate quantities of fine oxides may be dispersed and crystallized in the weld metal by limiting an amount of oxygen and contents of Si, Mn, Al and Ti which are deoxidation or oxidation elements, whereby sufficient strength and toughness of the weld metal can be ensured.

The present invention is described below.

(1) An ultrahigh-strength welded joint with superior strength and toughness, comprising a steel plate having a plate thickness of 4 mm to 12 mm and including weld metal of almost full martensite structure, wherein, in a cross-section of the welded joint in a direction perpendicular to a welding direction, a cross-sectional shape of the weld metal has a width W1 at a surface of the steel plate and a width W2 at a position where is separated from the surface by three-quarters of the plate thickness, the width W1 being 2.0 mm to 7.0 mm and the width W2 being 0.5 mm to 2.4 mm, wherein the weld metal comprises, by mass %, C: over 0.09% to 0.24%; Si: 0.2% to 1.0%; Mn: 0.5% to 2.5%; P: 0.02% or less; S: 0.02% or less; Al: 0.004% to 0.08%; Ti: 0.005% to 0.15%; O: 0.005% to 0.05%; and Ni: 1.0% to 9%, wherein a carbon equivalent (Ceq) as defined by equation (1) is 0.40% to 1.00%, a value Y as defined by equation (2) is 0.07% to 0.20%, and a balance of the weld metal is constituted by unavoidable impurities and Fe.

$$Ceq=[C]+[Si]/24+[Mn]/6+[Ni]/40+[Cr]/5+[Mo]/4+[V]/14 \quad (1)$$

$$Y=([Si]+[Mn])/40+[Al]+[Ti] \quad (2)$$

In equations (1) and (2), elements with "[ ]" represent contents (mass %) of respective elements.

(2) The ultrahigh-strength welded joint with superior strength and toughness according to (1), wherein the weld metal further comprises, by mass %, one or more of: Cr: 0.1% to 2.0%; Mo: 0.1% to 1.5%; V: 0.005% to 0.2%; Nb: 0.005% to 0.1%; Cu: 0.01% to 1.0%; and B: 0.0005% to 0.01%.

(3) A method for producing the ultrahigh-strength welded joint according to (1) or (2), by means of single-pass welding of a steel plate having tensile strength of 1100 Mpa or more and having a plate thickness of 4 mm to 12 mm, by using laser hybrid welding, in which a solid wire is used and a laser beam and gas shielded arc welding are combined, wherein the steel plate comprises, by mass %, C, 0.10% to 0.25%; Si: 0.03% to 1.0%; Mn: 0.5% to 2.5%; P: 0.02% or less; S: 0.01% or less; Al: 0.002% to 0.1%; N, 0.001% to 0.006%; and O: 0.001% to 0.004%, wherein the steel plate further comprises, by mass %, one or more of: Ni: 0.01% to 6.0%; Cr: 0.1% to 2.0%; Mo: 0.1% to 2.0%; V: 0.01% to 0.2%; Ti: 0.01% to 0.20%; Nb: 0.005% to 0.2%; Cu: 0.005% to 1.0%; B: 0.0002% to 0.030%; and Ca: 0.0006% to 0.0100%, wherein a carbon equivalent (Ceq) as defined by equation (1) is 0.4% to 1.2%, and a balance of the steel plate is constituted by unavoidable impurities and Fe, wherein a solid wire, which is used for the laser hybrid welding of the steel, comprises, by mass %, C, 0.4% or less; Si: 1.5% or less; Mn: 4.0% or less; P: 0.02% or less; S: 0.02% or less; and Al: 0.08% or less, wherein the solid wire further comprises, by mass %, one or more of: Ti: 0.30% or less; Ni: 12.0% or less; Cr: 3.0% or less; Mo: 3.0% or less; V: 0.3% or less; Nb: 0.3% or less; Cu: 1.5% or less; and B: 0.0150% or less, wherein a balance of the solid wire is constituted by unavoidable impurities and Fe, and wherein, when performing the laser hybrid welding of the steel plate using the solid wire, mixed gas, which is constituted by mixing $O_2$ gas of 2% to 5% or $CO_2$ gas of 5% to 25% to Ar gas or He gas, is used as shield gas in the gas shielded arc welding.

$$Ceq=[C]+[Si]/24+[Mn]/6+[Ni]/40+[Cr]/5+[Mo]/4+[V]/14 \quad (1)$$

In equation (1), elements with "[ ]" represent contents (mass %) of respective elements.

(4) A method for producing the ultrahigh-strength welded joint according to (1) or (2), by means of single-pass welding of a steel plate having tensile strength of 1100 Mpa or more and having a plate thickness of 4 mm to 12 mm, by using laser hybrid welding, in which a flux-cored wire is used and a laser beam and gas shielded arc welding are combined, wherein the steel plate comprises, by mass %, C: 0.10% to 0.25%; Si: 0.03% to 1.0%; Mn: 0.5% to 2.5%; P: 0.02% or less; S: 0.01% or less; Al: 0.002% to 0.1%; N, 0.001% to 0.006%; and O: 0.001% to 0.004%, wherein the steel plate further comprises, by mass %, one or more of: Ni: 0.01% to 6.0%; Cr: 0.1% to 2.0%; Mo: 0.1% to 2.0%; V: 0.01% to 0.2%; Ti: 0.01% to 0.20%; Nb: 0.005% to 0.2%; Cu: 0.005% to 1.0%; B: 0.0002% to 0.030%; and Ca: 0.0006% to 0.0100%, wherein a carbon equivalent (Ceq) as defined by equation (1) is 0.4% to 1.2%, and a balance of the steel plate is constituted by unavoidable impurities and Fe, wherein a flux-cored wire, which is used for the laser hybrid welding of the steel, comprises, as alloy contents, by mass % relative to an entire wire, C, 0.4% or less; Si: 1.5% or less; Mn: 4.0% or less; P: 0.02% or less; S: 0.02% or less; and Al: 0.08% or less, wherein the flux-cored wire further comprises, by mass %, one or more of: Ti: 0.30% or less; Ni: 12.0% or less; Cr: 3.0% or less; Mo: 3.0% or less; V: 0.3% or less; Nb: 0.3% or less; Cu: 1.5% or less; and B: 0.0150% or less, wherein a balance of the flux-cored wire is constituted by unavoidable impurities and Fe, and wherein, when performing the laser hybrid welding of the steel plate using the flux-cored wire, one of pure Ar gas, pure He gas, or mixed gas, which is constituted by mixing $O_2$ gas of 5% or less or $CO_2$ gas of 25% or less to Ar gas or He gas, is used as shield gas in the gas shielded arc welding.

$$Ceq=[C]+[Si]/24+[Mn]/6+[Ni]/40+[Cr]/5+[Mo]/4+[V]/14 \quad (1)$$

In equation (1), elements with "[ ]" represent contents (mass %) of respective elements.

Effects of Invention

The present invention provides an ultrahigh-strength welded joint with high productivity, obtained by single-pass welding of a steel plate having tensile strength of 1100 Mpa or more and having a thickness of 4 mm to 12 mm, by using laser hybrid welding, in which a laser beam and gas shielded arc welding are combined. Further, the obtained weld metal is constituted by an almost full martensite structure which is refined by fine oxides crystallized in the weld metal. Therefore, nevertheless the weld metal is as welded and the microstructure is almost full martensite, the welded joint has the tensile strength of 1100 MPa or more, and the absorbed energy in 2 mm V-notch Charpy impact test at −40 degrees C. (vE-40) of 27 J/cm² or more. Accordingly, the welded joint may be used in a construction machine or industrial machine which is used in cold climates, and thus the industrial significance thereof is extremely great.

EMBODIMENTS FOR CARRYING OUT INVENTION

Below, embodiments of the present invention will be explained.

[Ultrahigh-Strength Welded Joint]

An ultrahigh-strength welded joint of the invention is constituted from an ultrahigh-strength steel having tensile strength of 1100 MPa to 1700 MPa and absorbed energy in 2 mm V-notch Charpy impact test at −40 degrees C. (vE-40) of 27 J/cm² or more, and is formed by welding a steel plate having a plate thickness of 4 mm to 12 mm. The ultrahigh-strength welded joint has a weld metal of almost full martensite structure.

Figure 1:
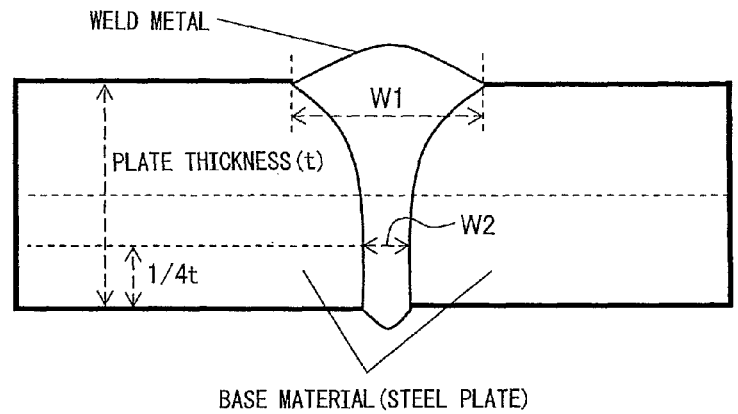
FIG. 1 is a cross-sectional view for explaining a cross-sectional shape of a welded joint.

Further, as shown in FIG. 1, the ultrahigh-strength welded joint of the invention has, in a cross-section of the welded joint in a direction perpendicular to a welding direction, a cross-sectional shape of the weld metal has a width W1 at a surface (i.e., a line which represents a surface of the steel plate on one side where a welding means is positioned) of the steel plate and a width W2 at a position where is separated from the surface by three-quarters of the plate thickness, width W1 being 2.0 mm to 7.0 mm and width W2 being 0.5 mm to 2.4 mm. The weld metal has a particular chemical composition, and is constituted by the refined martensite structure. By virtue of this, the welded joint may have the tensile strength of 1100 MPa or more and the absorbed energy in 2 mm V-notch Charpy impact test at −40 degrees C. (vE-40) of 27 J/cm² or more.

First, the reason for determining each component, in relation to the chemical composition of the weld metal, is explained. In this regard, "%" for each composition means mass %.

[C: over 0.09% to 0.24%]

C is a most important element for developing the strength of the martensite structure. When a content of C is low, the sufficient strength of the weld metal is not obtained, and over 0.09% is necessary. However, when C is excessively contained (over 0.24%), the toughness of the weld metal is deteriorated. Therefore, the content of C is over 0.09% to 0.24%. In addition, in order to stably ensure the strength and the toughness of the weld metal, a lower limit of C may be 0.11%, 0.12% or 0.14%, and an upper limit of C may be 0.20%, 0.18% or 0.16%.

[Si: 0.2% to 1.0%]

Si is a deoxidizing element and has a function for reducing oxygen (O) in the weld metal and improving cleanliness. Further, the residual Si in the weld metal contributes to forming oxides and refining the structure, whereby the toughness may be improved. In order to obtain these effects, it is necessary to increase the content of Si to 0.2% or more. On the other hand, when Si is excessively contained (over 1.0%), the oxides become coarse and the toughness of the weld metal is significantly deteriorated. Therefore, the content of Si in the weld metal is from 0.2% to 1.0%. In addition, in order to stably ensure the toughness of the weld metal, a lower limit of Si may be 0.25%, 0.3% or 0.35%, and an upper limit of Si may be 0.8%, 0.7% or 0.6%.

[Mn: 0.5% to 2.5%]

Mn is an element for ensuring the hardenability and increasing the strength of the weld metal. Further, Mn has a function for forming oxides in the weld metal and improving the toughness by refining the structure. In order to obtain these effects, it is necessary to make the content of Mn 0.5% or more. On the other hand, when the content of Mn exceeds 2.5%, a retained austenite is excessively formed in the weld metal. As a result, the grain-boundary embrittlement susceptibility is increased, and the toughness and/or the weld cracking resistance is likely to be deteriorated. Therefore, the content of Mn in the weld metal is from 0.5% to 2.5%. In addition, in order to stably ensure the strength and the toughness of the weld metal, a lower limit of Mn may be 0.7%, 0.9%, 1.0% or 1.1%, and an upper limit of Mn may be 2.0%, 1.9%, 1.8% or 1.7%.

[P: 0.02% or Less]

P is an unavoidable impurity element and deteriorates the toughness. Therefore, it is necessary to reduce the content of P as possible. When the content of P in the weld metal is 0.02% or less, negative influence of P on the toughness of the weld metal is acceptable. Therefore, the content of P in the weld metal is 0.02% or less. In order to further improve the toughness, an upper limit of P may be 0.015% or 0.010%.

[S: 0.02% or Less]

S is also an unavoidable impure element, and deteriorates the toughness when S is excessively contained in the weld metal. Therefore, it is necessary to reduce the content of S as much as possible. When the content of S in the weld metal is 0.02% or less, negative influence of S on the toughness and the ductility is acceptable. Therefore, the content of S in the weld metal is made 0.02% or less. In order to further improve the toughness, an upper limit of S may be 0.015%, 0.010% or 0.006%.

[Al: 0.004% to 0.08%]

Al is a deoxidizing element, similarly to Si, and has a function for reducing an amount of oxygen in the weld metal and improving cleanliness. Further, Al has a function for forming oxides in the weld metal and refining the martensite structure (block or packet). In order to obtain these effects, it is necessary to increase the content of Al to 0.004% or more. On the other hand, when Al is excessively contained (over 0.08%) in the weld metal, coarse oxides are formed and the coarse oxides significantly deteriorate the toughness. Therefore, the content of Al in the weld metal is from 0.004% to 0.08%. In addition, in order to obtain sufficient effect in improving the toughness of the weld metal, a lower limit of Al may be 0.010%, 0.015% or 0.018%. Further, in order to avoid the coarse oxides being generated, an upper limit of Al may be 0.06%, 0.04% or 0.03%.

[Ti: 0.005% to 0.15%]

Ti is effective as a deoxidizing element in the weld metal, and fixes solid solution N in the weld metal as nitrides so as to mitigate negative influence of solid solution N on the toughness. Further, Ti has a function for forming oxides and refining the martensite structure (block or packet). In order to improve the toughness of the weld metal due to these effects, it is necessary to contain Ti of 0.005% or more in the weld metal. On the other hand, when Ti is excessively contained (over 0.15%) in the weld metal, it is likely that coarse oxides are formed and the toughness is deteriorated due to excessively crystallized TiC. Therefore, the content of Ti in the weld metal is from 0.005% to 0.15%. In addition, in order to obtain sufficient effect in improving the toughness of the weld metal, a lower limit of Ti may be 0.015%, 0.025% or 0.030%, and an upper limit of Ti may be 0.14%, 0.12% or 0.10%.

[O: 0.005% to 0.05%]

Generally, O is treated as an impurity, and it is considered that O should be reduced as much as possible. However, in the invention, in order to refine the martensite structure, the oxides are refined and dispersed in the weld metal. By virtue of this, when martensitic transformation occurs during a cooling process after the welding, the oxides inhibit the growth of the structure (block or packet) and refine the structure, whereby the toughness of the weld metal is improved. In order to obtain the effect in improving the toughness due to the refinement effect of the oxides, it is necessary to contain O of 0.005% or more in the weld metal. On the other hand, the oxide becomes a start point of ductile fracture and lowers the toughness. When O is contained over 0.05%, the deterioration of the toughness by the oxides has an impact more than the improvement of the toughness by the refinement.

Therefore, the content of O in the weld metal is from 0.005% to 0.05%. In addition, in order to obtain sufficient effect of the oxides in refining the microstructure of the weld metal, a lower limit of O may be 0.010%, 0.015% or 0.020%, and an upper limit of O may be 0.045%, 0.040% or 0.035%.

[Ni: 1.0% to 9%]

Ni is an element which improves the toughness of the steel in solid solution state, and a unique element capable of stably improving the toughness regardless of the other components or structures of the weld metal. In particular, Ni is necessary to ensure the toughness of the high-strength weld metal. Therefore, it is necessary to increase the content of Ni 1.0% or more. Although it is advantageous to increase the content of Ni in the sense of the improvement of the toughness, the effect in improving the toughness is saturated when the content of Ni in the weld metal exceeds 9%.

Therefore, the content of Ni in the weld metal is limited to 1.0% to 9%. In addition, in order to obtain stable effect of Ni in improving the toughness, it is preferable that a lower limit of Ni is 1.6%, 2.1% or 2.6%. In addition, since Ni is a costly element, an upper limit of Ni may be 7.5%, 6.0% or 5.0%.

The weld metal, constituted by the above elements and a balance of unavoidable impurities and Fe, is a basic constitution of the weld metal included in the ultrahigh-strength welded joint of the invention. In addition, in order to further adjust a particular mechanical characteristic of the weld metal, one or more of Cr, Mo, V, Nb, Cu and B may be contained in the weld metal, as needed, as described below.

[Cr: 0.1% to 2.0%]

Cr is an effective element in increasing the strength by improving the hardenability, and Cr may be contained in the weld metal by 0.1% or more. On the other hand, when the content of Cr exceeds 2.0%, the toughness is significantly deteriorated. Therefore, an upper limit of the content of Cr is 2.0%. In order to stably obtain the effect of Cr, a lower limit of Cr may be 0.2% or 0.3%. The upper limit of Cr may be 1.5%, 1.2%, 0.8% or 0.5%.

[Mo: 0.1% to 1.5%]

Mo is an element which improves the hardenability for increasing tensile strength TS of the weld metal. In order to obtain this effect, Mo may be contained in the weld metal by 0.1% or more. On the other hand, when the content of Mo exceeds 1.5%, the effect in increasing the strength is saturated. Therefore, the content of Mo when being contained in the weld metal is from 0.1% to 1.5%. In order to stably obtain the effect of Mo, a lower limit of Mo may be 0.2% or 0.3%. An upper limit of Mo may be 1.2%, 1.0%, 0.8% or 0.6%.

[V: 0.005% to 0.2%]

V is an effective element in forming fine carbides and ensuring the strength of the weld metal by precipitation strengthening. In order to obtain this effect, V may be contained in the weld metal by 0.005% or more. On the other hand, when the content of V in the weld metal exceeds 0.2%, coarse precipitates are formed and the toughness is deteriorated. Therefore, the content of V when being contained in the weld metal is from 0.005% to 0.2%. In order to stably obtain the effect of V, a lower limit of V may be 0.02% or 0.04%. As needed, an upper limit of V may be 0.18%, 0.16%, 0.12% or 0.08%.

[Nb: 0.005% to 0.1%]

Nb is a ferrite-stabilizing element and is effective in reducing retained austenite. Further, Nb is effective in forming fine carbides and ensuring the strength of the weld metal by precipitation strengthening. In order to obtain these effects, Nb may be contained in the weld metal by 0.005% or more. On the other hand, when the content of Nb in the weld metal exceeds 0.1%, coarse precipitates are formed and the toughness is deteriorated. Therefore, the content of Nb when being contained in the weld metal is from 0.005% to 0.1%. In order to stably obtain the effect of Nb, a lower limit of Nb may be 0.008% or 0.010%. As needed, an upper limit of Nb may be 0.08%, 0.06%, 0.04% or 0.03%.

[Cu: 0.01% to 1.0%]

Cu is an effective element in improving the strength, and in order to obtain the effect in improving the strength, Cu may be contained in the weld metal by 0.01% or more. On the other hand, when the content of Cu in the weld metal exceeds 1.0%, the toughness of the weld metal is deteriorated. Therefore, the content of Cu when being contained in the weld metal is from 0.01% to 1.0%. In order to stably obtain the effect of Cu, a lower limit of Cu may be 0.05% or 0.10%. In order to improve the toughness, an upper limit of Cu may be 0.8%, 0.6%, 0.3% or 0.2%.

[B: 0.0005% to 0.01%]

B is an element which contributes to improving the hardenability and increasing the strength. Further, B is combined with solid solution N in the weld metal so as to constitute BN, and also improves the toughness of the weld metal. In order to assuredly obtain these effects, B may be contained in the weld metal by 0.005% or more. On the other hand, when the content of B exceeds 0.01%, B becomes excessive and the excess B forms coarse BN and/or B-compound such as Fe23(C,B)6 which deteriorates the toughness. Therefore, the content of B when being contained in the weld metal is limited to 0.0005% to 0.01%. In order to obtain stable effect of B, a lower limit of B may be 0.0008% or 0.0010%. In order to improve the toughness, an upper limit of B may be 0.008%, 0.006%, 0.004%, 0.003% or 0.002%.

In the present invention, in order to ensure tensile strength (TS) of the weld metal of the ultrahigh-strength welded joint, a carbon equivalent (Ceq) as following equation (1), defined by the standard of the Japan Welding Engineering Society (WES), which is an index of the hardening hardness, is made 0.40% to 1.00%, $$Ceq=[C]+[Si]/24+[Mn]/6+[Ni]/40+[Cr]/5+[Mo]/4+[V]/14 \quad (1)$$

In equation (1), elements with "[ ]" represent contents (mass %) of respective elements. In addition, the content of the uncontained element is calculated as zero %.

The Ceq as defined by equation (1) represents the hardening hardness of the weld metal. In order to ensure the target tensile strength of the weld metal, it is necessary to limit the content of C, Si, Mn, Ni, Cr, Mo and V in the weld metal so that the Ceq defined by equation (1) is 0.40% or more. When the Ceq is less than 0.40%, the hardening hardness is insufficient and the target tensile strength (TS) or 1100 MPa is not achieved. Further, although the hardening hardness is increased as the Ceq defined by equation (1) increases, the toughness of the weld metal is deteriorated when the Ceq exceeds 1.00%. Therefore, the Ceq defined by equation (1) is limited to 0.40% to 1.00%. In order to improve the tensile strength of the weld metal, a lower limit of the Ceq may be 0.50%, 0.60% or 0.65%. In order to reduce the deterioration of the toughness of the weld metal, an upper limit of the Ceq may be 0.90%, 0.85% or 0.80%.

In the present invention, in order to ensure the toughness of the weld metal of the ultrahigh-strength welded joint, fine oxides are crystallized in the weld metal so as to refine the martensite structure (block or packet). In order to obtain the effect, the content of Si, Mn, Al and Ti in the weld metal are determined so that a value Y defined by following equation (2) is 0.07% to 0.20%.

$$Y=([Si]+[Mn])/40+[Al]+[Ti] \quad (2)$$

In equation (2), elements with "[ ]" represent contents (mass %) of respective elements.

In this regard, the relationship between the Y defined by equation (2) and toughness is explained with reference to the drawings.

It is preferable that a welded joint, used in a large construction machine or industrial machine, has absorbed energy in 2 mm V-notch Charpy impact test at −40 degrees C. (vE-40) of 27 $J/cm^2$ or more.

In order to achieve the target, the inventors considered that the martensite structures are refined by crystallizing fine oxides in the weld metal of the welded joint, and investigated the relationship between (vE-40) and the content of Si, Mn, Al and Ti which contribute the crystallization of the oxides.

As a result, it was found that Si, Mn, Al and Ti greatly differ in a function for combining with oxygen and crystallizing the fine oxides, although any of these elements may crystallize the fine oxides.

Therefore, the inventors found above equation (2) which limits a composition ratio of Si, Mn, Al and Ti, taking the above difference into consideration, and investigated the relationship between the Y defined by equation (2) and (vE-40).

Figure 3:
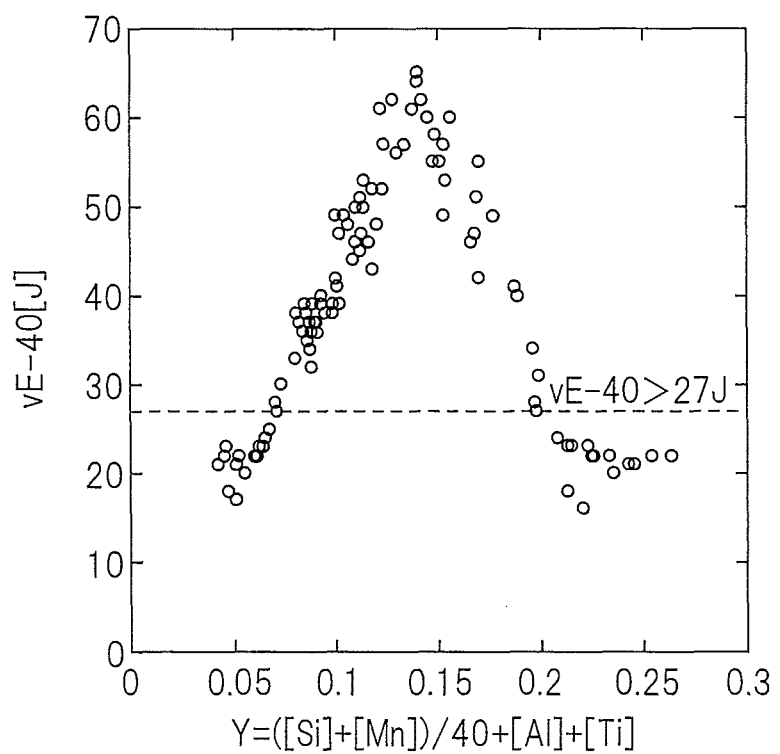
FIG. 3 is a graph showing the relationship between absorbed energy in 2 mm V-notch Charpy impact test at −40 degrees C. (vE-40) and a value defined by an equation (Y=([Si]+[Mn])/40+[Al]+[Ti]).

As a result, as shown in FIG. 3, it was found that, when value Y defined by equation (2) is less than 0.07% or more than 0.20%, it is difficult obtain a value of 27 $J/cm^2$ or more in (vE-40). Because, when value Y is less than 0.07%, the number of the oxides in the weld metal is insufficient and the effect in refining the martensite structure is not obtained. On the other hand, when value Y is more than 0.20%, the effect in refining the martensite structure due to the oxides is saturated, and the ductile fracture characteristic is deteriorated due to increase of the oxides. In other words, in the both cases, (vE-40) is insufficient.

Accordingly, value Y defined by equation (2) is limited to 0.07% to 0.20%. In addition, in order to stably obtain the effect in refining the martensite structure, a lower limit of the Y may be 0.08%, 0.09%, 0.10% or 0.12%. An upper limit of the Y may be 0.18%, 0.17%, 0.16% or 0.15%.

Next, the reason for determining a cross-sectional shape of the welded joint in a direction perpendicular to a welding direction is explained.

In the present invention, in the cross-sectional shape as shown in FIG. 1, a width of the weld metal at a steel surface is referred to as W1, and a width of the weld metal, at a position where is separated from the surface by three-quarters of the plate thickness, is referred to as W2. In this case, W1 is from 2.0 mm to 7.0 mm, and W2 is from 0.5 mm to 2.4 mm. The weld metal having such a shape may be obtained by means of single-pass welding of the steel plate having the thickness of 4 mm to 12 mm, by using laser hybrid welding, in which a laser beam and gas shielded arc welding are combined.

By using the laser hybrid welding in the single-pass welding of the steel plate having the thickness of 4 mm to 12 mm, input heat can be significantly reduced in comparison to single-pass welding using gas shielded arc welding. Due to the significant reduction of the input heat, a rapid cooling rate can be realized, and fine oxides can be crystallized in the weld metal. Therefore, the martensite structure can be refined and the toughness of the weld metal can be improved.

When width W1 is less than 2.0 mm, it is necessary to lower an amount of deposit in the gas shielded arc welding, and in order to lower the amount of deposit, it is necessary to significantly lower current or voltage so as to reduce the input heat. When the current or voltage is too low, an arc state becomes unstable and a welding defect is likely to occur. On the other hand, when width W1 is more than 7.0 mm, it is necessary to raise the input heat of the gas shielded arc welding, whereby the cooling rate is lowered. Accordingly, an amount of crystallized fine oxides in the weld metal is lowered, and the effect in improving the toughness is disadvantageously deteriorated.

Therefore, a range of width W1 is from 2.0 mm to 7.0 mm. As needed, a lower limit of W1 may be 2.5 mm or 3.0 mm, and an upper limit of W1 may be 6.0 mm, 5.5 mm or 5.0 mm.

When width W2 is less than 0.5 mm, the weld metal formed at the position, where is separated from the plate surface by three-quarters of the plate thickness, is not likely to contain O and a welding wire composition of the gas shielded arc welding, whereby the effect in improving the toughness is disadvantageously deteriorated. On the other hand, when width W2 is more than 2.4 mm, it is necessary to greatly increase laser output, whereby generation of metal vapor is increased. Accordingly, the welding becomes unstable and the welding defect is likely to occur.

Therefore, in the invention, a range of width W2 is from 0.5 mm to 2.4 mm. As needed, a lower limit of W2 may be 0.7 mm or 0.9 mm, and an upper limit of W2 may be 2.2 mm, 2.0 mm or 1.8 mm.

In the present invention, in order to judge that the microstructure of the weld metal is almost full martensite, a following method may be adopted:

When a hardness value, obtained by subtracting the hardness of the martensite structure calculated by following equation (4) from a result of the Vickers hardness measurement of the weld metal, is −20 or more, it is judged that the obtained weld metal has almost full martensite.

[Production Method of Ultrahigh-Strength Welded Joint]

In order to manufacture the ultrahigh-strength welded joint of the invention, first, a steel plate having the tensile strength of 1100 MPa or more and the thickness of 4 mm to 12 is provided as a base material.

By using the steel plate having the tensile strength of 1100 MPa or more, the welded joint having sufficient strength to be used in a large construction machine or industrial machine, is obtained.

By limiting the thickness of the steel plate to a range between 4 mm and 12 mm, the single-pass welding using the laser hybrid welding can be carried out, and high productivity may be obtained in comparison to the case wherein multi-pass welding is carried out. When the thickness of the steel plate is less than 4 mm, the single-pass welding can be carried out without using the laser hybrid welding. On the other hand, when the thickness of the steel plate is more than 12 mm, the single-pass welding using the laser hybrid welding may not be carried out.

Next, the reason for determining each component, in relation to the composition of the steel plate or the base material, is explained. In this regard "%" for each composition means mass %.

[C: Over 0.10% to 0.25%]

C is an important element for developing the tensile strength. In order to make the tensile strength of the steel plate 1100 MPa or more, it is necessary to contain C by 0.10% or more. However, when C is contained over 0.25%, the toughness and cold cracking resistance are significantly deteriorated. Therefore, the content of C is limited to 0.10% to 0.25%. As needed, an upper limit of C may be 0.20%, 0.18% or 0.16%, and a lower limit of C may be 0.11% or 0.12%.

[Si: 0.03% to 1.0%]

Si is a deoxidizing element and maintains the soundness of the steel. Further, Si contributes to improving the toughness of the weld metal when Si is contained in the weld metal due to dilution of the base material by welding. To this end, it is necessary to contain Si in the steel plate by at least 0.03%. However, when Si is excessively contained (over 1.0%), the strength is increased and the toughness and the cold cracking resistance are advantageously deteriorated. Therefore, the content of Si is from 0.03% to 1.0%. In order to assured deoxidizing, a lower limit of Si may be 0.10% or 0.15%. An upper limit of Si may be 0.5%, 0.4% or 0.3%.

[Mn: 0.5% to 2.5%]

Mn is an essential element for ensuring the hardenability and increasing the strength. Further, Mn contributes to improving the toughness of the weld metal when Mn is contained in the weld metal due to dilution of the base material by welding. In order to obtain the effect, it is necessary to contain Mn 0.5% or more. On the other hand, when Mn is contained over 2.5%, the grain-boundary embrittlement susceptibility is increased, and the toughness and the cold cracking resistance are likely to be deteriorated. Therefore, the content of Mn is limited to 0.5% to 2.5%. As needed, a lower limit of Mn may be 1.0%, 1.2% or 1.5%, and an upper limit of Mn may be 2.3%, 2.1% or 1.9%.

[P: 0.02% or Less]

P is an unavoidable impurity element and deteriorates the toughness of the base material and a welded heat-affected zone. Therefore, it is necessary to reduce the content of P as possible. When the content of P is 0.02% or less, negative influence of P on the toughness of the steel plate is acceptable. Therefore, the content of P is 0.02% or less. In order to improve the toughness, an upper limit of P may be 0.015%, 0.012% or 0.010%.

[S: 0.01% or Less]

S is also an unavoidable impurity element, and deteriorates the toughness and the ductility when S is excessively contained in the steel plate. Therefore, it is necessary to reduce the content of S as possible. When the content of S is 0.02% or less, negative influence of S on the toughness and the ductility is acceptable. Therefore, the content of S in the weld metal is 0.02% or less. In order to improve the toughness and the ductility, an upper limit of S may be 0.008%, 0.006% or 0.005%.

[Al: 0.002% to 0.1%]

Al is a deoxidizing element, similarly to Si, and has a function for reducing an amount of oxygen in the steel plate and improving cleanliness of the steel. Further, Al contributes to improving the toughness by forming oxides in the weld metal when Al is contained in the weld metal due to dilution of the base material by welding. To this end, it is necessary to contain Al in the steel plate by 0.002% or more. On the other hand, when Al is excessively contained (over 0.1%), coarse oxides are formed and the toughness is deteriorated. Therefore, the content of Al is from 0.002% to 0.1%. In order to assured deoxidizing, a lower limit of Al may be 0.010% or 0.015%. In order to avoid the coarse oxides being generated, an upper limit of Al may be 0.081%, 0.070%, 0.060% or 0.050%.

[N: 0.001% to 0.006%]

A small amount of N contributes to the toughness by forming fine nitrides when heating the steel plate and by refining heated austenite grain size. To this end, the content of N in the steel plate is required to be 0.001% or more. On the other hand, when N is contained over 0.006%, the toughness is deteriorated due to increase in solid solution N. Therefore, the content of N is from 0.001% to 0.006%. In order to improve the toughness, an upper limit of N may be 0.005% or 0.0045%.

[O: 0.001% to 0.004%]

Oxygen (O) is an unavoidable impurity, and forms oxides in the steel plate. Generally, the oxide in the steel plate is coarse and may deteriorate the toughness, it is desired that O should be reduced as possible. When the content of O in the steel plate is 0.004% or less, the negative influence on the toughness can be ignored. Further, in order to reduce 0 less than 0.001%, cost for removing 0 in a steel making process is increased. Therefore, the content of O is from 0.001% to 0.004%. In order to improve the toughness, an upper limit of O may be 0.003% or 0.0025%.

The composition, containing the above elements and a balance of unavoidable impurities and Fe, is a basic constitution of the steel plate used in the ultrahigh-strength welded joint of the invention. In addition, in order to further adjust a particular mechanical characteristic of the steel plate, one or more of Ni, Cr, Mo, V, Ti, Nb, Cu, B and Ca may be contained in the steel plate, as needed, as described below.

[Ni: 0.01% to 6.0%]

Ni is a unique element which contributes to increasing the strength by improving the hardenability and simultaneously increases the toughness. In order to obtain the effect in improving the strength and the toughness, Ni may be added to the steel plate by 0.01% or more. Although the addition of Ni contributes to improving the toughness, an oxidized scale, generated in a manufacturing process of the steel plate, is difficult to be peeled as the amount of addition of Ni is increased. Since a cost for removing the oxidized scale is high, the amount of addition of Ni is limited to 6.0% or less. Therefore, when Ni is contained in the steel plate, the content of Ni is from 0.01% to 6.0%. In order to reduce the cost, an upper limit of Ni may be limited to 4.0%, 3.0%, 2.0% or 1.0%.

[Cr: 0.1% to 2.0%]

Cr is an effective element in improving the hardenability and increasing the strength of the steel plate due to precipitation strengthening. In order to obtain the effect thereof, Cr may be added by 0.1% or more. On the other hand, when the Cr is contained over 2.0%, the toughness of the steel plate is deteriorated. Therefore, when Cr is contained, the content thereof is from 0.1% to 2.0%. As needed, an upper limit of Cr may be limited to 1.0%, 0.8% or 0.5%.

[Mo: 0.1% to 2.0%]

Mo is an effective element in improving the hardenability and increasing the strength of the steel plate due to precipitation strengthening. In order to obtain the effect thereof, Mo may be added by 0.1% or more. On the other hand, when the Mo is contained over 2.0%, the toughness of the steel plate is deteriorated. Therefore, when Mo is contained, the content thereof is from 0.1% to 2.0%. As needed, an upper limit of Mo may be limited to 1.0%, 0.6%, 0.4% or 0.2%.

[V: 0.01% to 0.2%]

V is an effective element in improving the strength of the steel plate due to precipitation strengthening. In order to obtain the effect thereof, V may be added by 0.01% or more. On the other hand, when the V is contained over 0.2%, the toughness of the steel plate is deteriorated. Therefore, when V is contained, the content thereof is from 0.01% to 0.2%. As needed, an upper limit of V may be limited to 0.1%, 0.06% or 0.04%.

[Ti: 0.01% to 0.20%]

Ti is an effective element in improving the strength of the steel plate due to precipitation strengthening. Further, Ti forms TiN which is stable at high temperature. TiN restricts coarsening of the austenite grain size during welding, and also contributes to improving the toughness. In order to obtain the effect thereof, Ti may be added by 0.01% or more. On the other hand, when the Ti is contained over 0.20%, coarse inclusions are formed and the toughness is deteriorated. Therefore, when Ti is contained, the content thereof is 0.01% to 0.20%. As needed, an upper limit of Ti may be limited to 0.16%, 0.12%, 0.06% or 0.04%. In addition, in order to improve the strength, it is preferable that Ni or Ti is added.

[Nb: 0.005% to 0.2%]

Nb is an effective element in increasing the strength of the steel plate due to precipitation strengthening and the improved hardenability. In order to assuredly obtain the effect thereof, Nb may be added by 0.005% or more. On the other hand, when the Nb is contained over 0.2%, the toughness is disadvantageously deteriorated. Therefore, when Nb is contained, the content thereof is from 0.005% to 0.20%. As needed, an upper limit of Nb may be limited to 0.12%, 0.08%, 0.05% or 0.02%.

[Cu: 0.005% to 1.0%]

Cu is an effective element in increasing the strength of the steel plate mainly due to the increase of hardenability, solid-solution strengthening and precipitation strengthening. In order to obtain the effect thereof, Cu may be added by 0.005% or more. On the other hand, when the Cu is contained over 1.0%, hot workability disadvantageously has a problem. Therefore, when Cu is contained, the content thereof is from 0.005% to 1.0%. As needed, an upper limit of Cu may be limited to 0.5%, 0.3% or 0.2%.

[B: 0.0002% to 0.030%]

B is an effective element in improving the strength, since B in the solid solution state is segregated at an austenite grain boundary and a small amount of B may improve the hardenability. In order to obtain the effect in improving the hardenability, B may be contained by 0.0002% or more. On the other hand, when the B is contained in the steel plate over 0.030%, coarse inclusions are formed and the toughness is significantly deteriorated. Therefore, when B is contained, the content thereof is limited to 0.0002% to 0.030%. As needed, an upper limit of B may be limited to 0.010%, 0.005%, 0.003% or 0.002%.

[Ca: 0.0006% to 0.0100%]

Ca is effective in improving the ductility characteristic by limiting extension of sulfides in the steel. Ca is also effective in improving the toughness of the welded heat-affected zone because Ca oxides restrict coarsening of the austenite grain size during welding. In order to obtain the effect thereof, Ca may be contained by 0.0006% or more. On the other hand, when the Ca is excessively contained over 0.0100%, coarse inclusions are formed and the toughness is disadvantageously deteriorated. Therefore, when Ca is contained, the content thereof is limited to 0.0006% to 0.0100%. As needed, an upper limit of Ca may be limited to 0.0050%, 0.0030% or 0.0020%.

Generally, Ca does not remain in the weld metal. Because Ca has high ability to bind oxygen, Ca oxides are formed in a weld pool during welding, and then the oxides emerge and are discharged into a slag.

[Ceq: 0.4% to 1.2%]

In the invention, in order to increase the strength of the steel plate, it is necessary to limit the Ceq or the index of the hardenability, represented by equation (1), as well as the content of each element. In order to obtain the strength of the steel plate, the Ceq is required to be 0.40% or more. As the Ceq increases, the strength is increased. On the other hand, when the Ceq is more than 1.2%, the toughness is greatly deteriorated. Therefore, in the invention, the Ceq is limited to 0.40% to 1.2%. As needed, a lower limit of the Ceq may be limited to 0.45%, 0.50% or 0.55%, and an upper limit of the Ceq may be limited to 1.0%, 0.80% or 0.70%.

$$Ceq=[C]+[Si]/24+[Mn]/6+[Ni]/40+[Cr]/5+[Mo]/4+[V]/14 \quad (1)$$

In equation (1), elements with "[ ]" represent contents (mass %) of respective elements.

As the steel plate, any steel plate manufactured by any conventional method may be possible, as long as the steel plate has the tensile strength of 1100 MPa or more and the thickness of 4 mm to 12 mm and has the above compositions, since a welded joint which satisfies the characteristic of the invention may be obtained by such a steel plate. Therefore, although the steel plate is not limited to a particular steel plate, as a steel plate which is preferably used in the production method of the invention, for example, WEL-TEN950 series (trade name, available from Nippon Steel Corporation) or WELDOX (trade name, available from Swedish Steel AB (SSAB)) may be possible.

The shape of the ultrahigh-strength welded joint manufactured in the invention is determined depending on the application or the like thereof, and is not particularly limited. Therefore, the shape of the welded steel plate is also determined depending on the application or the like after welding, and is not particularly limited. For example, the steel plate may be formed in a predetermined shape such as a tube.

Further, it is preferable that the shape of the welded steel plate is formed by laying steel plates to be welded in generally the same plane and butting end surfaces of the steel plates. A welding condition of the laser hybrid welding may be properly selected so that the shape has widths W1 and W2. A preferable shape of a groove of the steel plate has a groove angle of 20 degrees to 50 degrees, a groove depth of ⅓t to ⅔t, and a root gap of 0 mm to 1.0 mm.

Next, the single-pass welding of the steel plate satisfying the above condition is carried out by means of the laser hybrid welding so as to manufacture the ultrahigh-strength welded joint having the weld metal of almost full martensite structure.

As the welding wire, a solid wire, or a flux-cored wire wherein a flux is filled inside of a steel skin, is used. As the solid wire or the flux-cored wire to be used, a wire including, as alloy contents, by mass % relative to the entire wire, C, 0.4% or less; Si: 1.5% or less; Mn: 4.0% or less; P: 0.02% or less; S: 0.02% or less; and Al: 0.08% or less, and further including, by mass %, one or more of: Ti: 0.30% or less; Ni: 12.0% or less; Cr: 3.0% or less; Mo: 3.0% or less; V: 0.3% or less; Nb: 0.30% or less; and B: 0.0050% or less, wherein a balance of the solid wire is constituted by unavoidable impurities and Fe, may used, so that the weld metal of the above composition can be obtained in view of the composition dilution of the steel plate by welding. In addition, "%" with each element represents mass % thereof.

The reason for determining each component, in relation to the composition of the welding wire, is explained. In addition, "%" with each element represents mass % thereof.

[C: 0.4% or Less]

Although C is an essential element for developing the tensile strength, when the content of C exceeds 0.4%, C in the weld metal becomes excessive and the toughness and cold cracking resistance are greatly deteriorated. Therefore, C in the welding wire is 0.4% or less. In order to improve the toughness etc., an upper limit of C may be 0.30%, 0.27%, 0.25%, 0.22% or 0.20%. In order to improve the strength, a lower limit of C may be 0.10%, 0.13% or 0.15%.

[Si: 1.5% or Less]

Si is a deoxidizing element and reduces oxygen (O) in the weld metal to improve cleanliness. However, when the content of Si is the welding wire exceeds 1.5%, Si in the weld metal becomes excessive and coarse oxides are formed in the weld metal, whereby the toughness of the weld metal is significantly deteriorated. Therefore, the content of Si in the welding wire is 1.5% or less. In order to improve the toughness etc., an upper limit of Si may be 1.0%, 0.8%, 0.6%, 0.5% or 0.45%. In order to improve the strength, a lower limit of Si may be 0.10%, 0.15% or 0.20%.

[Mn: 4.0% or Less]

Mn is an element for ensuring the hardenability and increasing the strength of the weld metal. Further, Mn is an effective element in refining the microstructure and improving the toughness. When the content of Mn in the welding wire exceeds 4.0%, the amount of Mn in the weld metal becomes excessive and a retained austenite is excessively formed in the weld metal. As a result, the grain-boundary embrittlement susceptibility is increased, and the toughness and/or the weld cracking resistance is likely to be deteriorated. Therefore, in the invention, the content of Mn in the welding wire is 4.0% or less. In order to improve the toughness etc., an upper limit of Mn may be 3.0%, 2.5%, 2.2% or 2.0%. In order to improve the strength, a lower limit of Mn may be 0.5%, 1.0% or 1.4%.

[P: 0.02% or Less]

P is an unavoidable impurity element and deteriorates the toughness. Therefore, it is necessary to reduce the content of P as possible. When the content of P in the welding wire is 0.02% or less, negative influence of P on the toughness of the weld metal is acceptable. Therefore, in the invention, the content of P in the welding wire is 0.02% or less. In order to improve the toughness, an upper limit of P may be 0.015% or 0.013%.

[S: 0.02% or Less]

S is also an unavoidable impurity element, and deteriorates the toughness and the ductility when S is excessively contained in the weld metal. Therefore, it is necessary to reduce the content of S as possible. When the content of S in the welding wire is 0.02% or less, negative influence of S on the toughness and the ductility is acceptable. Therefore, the content of S in the welding wire is 0.02% or less. In order to improve the toughness and the ductility, an upper limit of S may be 0.015%, 0.013%, 0.010% or 0.007%.

[Al: 0.08% or Less]

Al is a deoxidizing element, similarly to Si, and has a function for reducing an amount of oxygen in the weld metal and improving cleanliness. Further, Al has a function for forming oxides in the weld metal and refining the martensite structure (block or packet). When Al is excessively contained (over 0.08%) in the welding wire, the amount of Al in the weld metal becomes excessive, coarse oxides are formed, and the coarse oxides significantly deteriorate the toughness. Therefore, the content of Al in the welding wire is 0.08% or less. As needed, an upper limit of Al may be 0.06%, 0.05%, 0.04% or 0.03%. As needed, a lower limit of Al may be 0.001%, 0.005%, 0.008% or 0.010%.

[Ti: 0.30% or Less]

Ti is effective as a deoxidizing element in the weld metal, and fixes solid solution N in the weld metal as nitrides so as to mitigate negative influence of solid solution N on the toughness. Further, Ti has a function for forming oxides and refining the martensite structure. However, when Ti is excessively contained (over 0.30%) in the welding wire, it is likely that coarse oxides are formed and the toughness is deteriorated due to excessively crystallized TiC. Therefore, the content of Ti in the welding wire is 0.030% or less. In addition, an upper limit of Ti may be 0.2%, 0.15% or 0.10%. Although it is not necessary to particularly determine a lower limit of Ti, the lower limit may be 0.01% or 0.03%.

[Ni: 12.0% or Less]

Ni is an element which improves the toughness of the steel in solid solution state, and a unique element capable of stably improving the toughness regardless of the other components or structures of the weld metal. In particular, Ni is necessary to ensure the toughness of the high-strength weld metal. When the content of Ni in the welding wire exceeds 12%, the effect in improving the toughness is saturated. Therefore, the content of Ni in the welding wire is limited to 12.0% or less. Since Ni is a costly element, an upper limit of Ni may be 9.0%, 6.0%, 4.0% or 3.5%. In addition, a lower limit of Ni may be 1.0%, 1.5% or 2.0%.

[Cr: 3.0% or Less]

Although Cr is an effective element in increasing the strength by improving the hardenability, when Cr is contained in the welding wire over 3.0%, the amount of Cr in the weld metal becomes excessive, the toughness is significantly deteriorated. Therefore, when Cr is contained in the welding wire, the content of Cr in the welding wire may be 3.0% or less. In addition, an upper limit of Cr may be 1.5%, 1.0%, 0.5% or 0.3%. Although it is not necessary to particularly determine a lower limit of Cr, the lower limit may be 0.05% or 0.1%.

[Mo: 3.0% or Less]

Although Mo is an effective element in increasing the tensile strength of the weld metal, when Mo is contained in the welding wire over 3.0%, the amount of Mo in the weld metal becomes excessive, and the toughness is deteriorated. Therefore, when Mo is contained, the content thereof may be 3.0% or less. In addition, an upper limit of Mo may be 1.5%, 1.0%, 0.5% or 0.3%. Although it is not necessary to particularly determine a lower limit of Mo, the lower limit may be 0.05% or 0.1%.

[V: 0.30% or Less]

Although V is an effective element in increasing the tensile strength of the weld metal, when V is contained in the welding wire over 0.3%, the amount of V in the weld metal becomes excessive, and the toughness is deteriorated. Therefore, when V is contained, the content thereof may be 0.30% or less. In addition, an upper limit of V may be 0.2%, 0.15%, 0.10% or 0.06%. Although it is not necessary to particularly determine a lower limit of V, the lower limit may be 0.01% or 0.02%.

[Nb: 0.30% or Less]

Nb is a ferrite-stabilizing element and is effective in reducing retained austenite. Further, Nb is effective in forming fine carbides and ensuring the strength of the weld metal by precipitation strengthening. However, when the content of Nb in the welding wire exceeds 0.3%, the amount of Nb in the weld metal becomes excessive, coarse precipitates are formed in the weld metal, and the toughness is deteriorated. Therefore, the content of Nb when being contained is 0.30% or less. In addition, an upper limit of Nb may be 0.2%, 0.15%, 0.10% or 0.08%. Although it is not necessary to particularly determine a lower limit of Nb, the lower limit may be 0.01% or 0.02%.

[Cu: 1.5% or Less]

Although Cu is an effective element in increasing the tensile strength of the weld metal, when the content of Cu in the welding wire exceeds 1.5%, the amount of Cu in the weld metal becomes excessive, and the toughness is deteriorated. Therefore, when Cu is contained, the content thereof may be 1.5% or less. In addition, an upper limit of Cu may be 1.0%, 0.6% or 0.4%. Although it is not necessary to particularly determine a lower limit of Cu, the lower limit may be 0.01% or 0.03%. In addition, the content of Cu in the welding wire includes Cu of copper plating around the wire.

[B: 0.0150% or Less]

B is an element which contributes to improving the hardenability and increasing the strength. Further, B is combined with solid solution N in the weld metal so as to constitute BN, and also improves the toughness of the weld metal. However, when the content of B in the welding wire exceeds 0.015%, B in the weld metal becomes excessive and the excess B forms coarse BN and/or B-compound such as Fe23(C,B)6 which rather deteriorates the toughness. Therefore, the content of B when being contained may be 0.0150% or less. In addition, an upper limit of B may be 0.0100%, 0.0050% or 0.0030%. Although it is not necessary to particularly determine a lower limit of B, the lower limit may be 0.0001% or 0.0003%.

As the laser hybrid welding using the above welding wire, a welding method, wherein the laser beam and the gas shielded arc welding are combined, is used.

As a laser for supplying the laser beam, which is not particularly limited, a YAG (Yttrium Aluminum Garnet) laser, a $CO_2$ laser or a fiber laser may be used.

Further, conditions of the laser hybrid welding (such as current, voltage, welding speed, input heat and preheat temperature, etc.) are not particularly limited, and may be properly determined corresponding to the thickness of the steel plate etc., so that the weld metal of almost full martensite structure can be obtained. For example, the input heat may be from 2.7 to 4.6 kJ/cm, and the welding speed may be from 100 to 120 cm/min.

When the solid wire is used as the welding wire for the laser hybrid welding, mixed gas, which is constituted by mixing $O_2$ gas of 2% to 5% or $CO_2$ gas of 5% to 25% to Ar gas or He gas, is used as shield gas in the gas shielded arc welding. By virtue of this, oxygen is supplied to the weld metal from the $O_2$ gas or the $CO_2$ gas in the shield gas, and thus the weld metal containing 0 of 0.005% to 0.05% may be obtained after the welding.

When the content of $O_2$ gas in the shield gas is less than 2%, or when the content of $CO_2$ gas in the shield gas is less than 5%, the content of O in the weld metal becomes insufficient, and the martensite structure in the weld metal is not sufficiently refined by the oxides, whereby the toughness improving effect cannot be sufficiently obtained. Further, when $O_2$ gas in the shield gas exceeds 5%, or when $CO_2$ gas in the shield gas exceeds 25%, the oxides is excessively crystallized in the weld metal, and the oxide becomes a start point of ductile fracture. Due to this, the toughness is more likely to be lowered.

On the other hand, when the flux-cored wire is used as the welding wire for the laser hybrid welding, pure Ar gas, pure He gas, or mixed gas, which is constituted by mixing $O_2$ gas of 5% or less or $CO_2$ gas of 25% or less to Ar gas or He gas, is used as shield gas in the gas shielded arc welding. When the flux-cored wire is used, oxygen is supplied to the weld metal from a metallic oxide such as an iron oxide contained in the flux, and thus the weld metal containing 0 of 0.005% to 0.05% may be obtained after the welding, even if oxygen is not supplied to the weld metal from the shield gas, unlikely to the case of the solid wire. Therefore, in the gas shielded arc welding, Ar gas or He gas, which does not include oxygen, may be used as the shield gas.

Next, a method, for obtaining the composition of the weld metal of the invention by using the above steel plate and the above welding wire, is explained.

Figure 2:
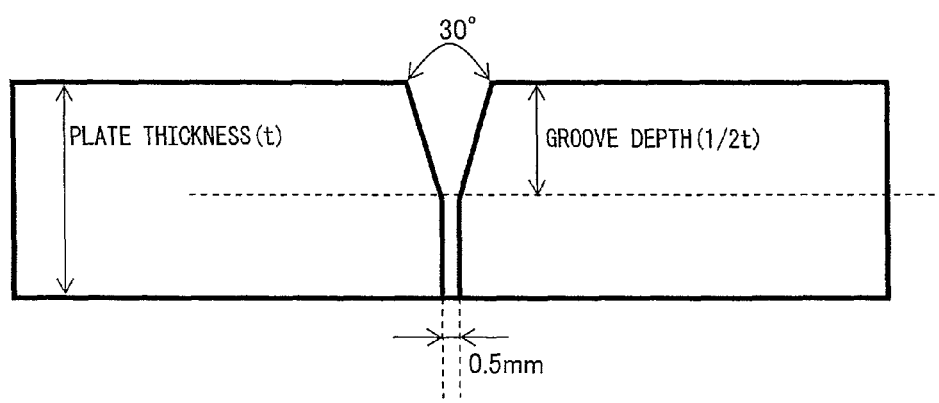
FIG. 2 is a cross-sectional view for explaining a groove shape of steel plates.

The composition of the weld metal is determined by dilution of the component of the welding wire and the component of the steel plate. A ration of the dilution is varied depending on the plate thickness, the shape of the groove, and the input heat in the gas shielded arc welding. For example, in the case of the laser hybrid welding using a groove having the cross-sectional shape as shown in FIG. 2 (at a Y-groove having the groove angle of 30 degrees, a root gap is 0.5 mm), a dilution ratio of the welding wire is about 65% when the plate thickness is 4 mm, about 70% when the plate thickness is 8 mm, and about 75% when the plate thickness is 12 mm. The remaining ratio in the respective thickness corresponds to a dilution ratio of the steel plate.

In addition, since C, Si, Mn and Ti are oxidatively consumed, 100% of these elements are not transited to the weld metal. A transit ratio to the weld metal is about 60% regarding C or Ti, and about 80% regarding Si or Mn. Regarding the other alloy elements, almost 100% thereof is transited to the weld metal.

By representing these relationships, the composition of the weld metal is represented by following equation (3). In order to obtain the composition of the weld metal of the invention, relative to the composition of the steel plate to be welded, the composition of the welding wire is selected by using a calculation method by means of equation (3).

[Composition of Weld Metal]=α×β×[Composition of Welding Wire]+(1−α)×[Composition of Steel Plate]  (3)

In equation (3), α=0.65 (when the plate thickness is 4 mm), α=0.70 (when the plate thickness is 8 mm) and α=0.75 (when the plate thickness is 12 mm); and β=0.6 (C, Ti), β=0.8 (Si, Mn) and β=1.0 (P, S, Al, Ni, Cr, Mo, V, Nb, Cu, B).

Character "[ ]" represent contents (mass %) of respective elements constituting the welding wire or the steel plate.

Example 1

A welded joint was manufactured by a production method as below, and was evaluated.

First, steel plates were provided and set at a welding position, each steel plate having a thickness, compositions (alloy contents), yield strength, tensile strength and toughness (vE-40) as shown in Table 1. As shown in FIG. 2, a groove of the steel plate was a Y-groove having a groove angle of 30 degrees, a groove depth of a half (½) of a steel plate thickness, and a root gap of 0.5 mm.

Then, single-pass welding was carried out by means of laser hybrid welding wherein a laser beam and gas shielded arc welding were combined, under conditions (current, voltage, welding speed, heat input, preheat temperature, compositions of shield gas and laser beam output) as shown in Tables 5 to 7, by using welding wires W1 to W108 having the compositions (alloy contents) as shown in Tables 2 to 4. As a result, a welded joint, having weld metal which penetrates in the plate thickness direction, was manufactured.

In addition, a YAG laser was used as the laser. In Tables 2 to 4, "SW" represents a solid wire, and "FCW" represents a flux-cored wire.

TABLE 1

| No. | Plate Thickness [mm] | Composition of Steel Plate [mass %] (Note 1) | | | | | | | | | | | |
|---|---|---|---|---|---|---|---|---|---|---|---|---|---|
| | | C | Si | Mn | P | S | Al | Ti | Ni | Cr | Mo | V | Nb |
| S1 | 4 | 0.15 | 0.21 | 1.5 | 0.015 | 0.004 | 0.013 | 0.198 | 0.2 | | | | |
| S2 | 4 | 0.11 | 0.90 | 2.4 | 0.007 | 0.005 | 0.032 | 0.024 | | | | | 0.005 |
| S3 | 4 | 0.18 | 0.13 | 0.6 | 0.005 | 0.002 | 0.046 | 0.175 | 0.5 | 0.2 | 0.8 | 0.06 | |
| S4 | 4 | 0.25 | 0.10 | 1.8 | 0.010 | 0.003 | 0.034 | | 1.8 | | 0.3 | 0.05 | |
| S5 | 8 | 0.12 | 0.20 | 1.5 | 0.007 | 0.005 | 0.056 | 0.012 | 0.8 | 0.2 | | | |
| S6 | 8 | 0.15 | 0.35 | 1.8 | 0.009 | 0.004 | 0.022 | 0.026 | | | | 0.01 | |
| S7 | 8 | 0.12 | 0.06 | 1.7 | 0.012 | 0.006 | 0.081 | 0.010 | 2.4 | 0.3 | 0.1 | 0.01 | 0.022 |
| S8 | 8 | 0.12 | 0.12 | 1.7 | 0.010 | 0.005 | 0.003 | 0.157 | 0.8 | 0.3 | | | |
| S9 | 12 | 0.10 | 0.38 | 2.2 | 0.007 | 0.003 | 0.036 | | 1.7 | 1.6 | | | 0.12 |
| S10 | 12 | 0.15 | 0.25 | 1.5 | 0.006 | 0.005 | 0.012 | 0.043 | | | 0.19 | | |
| S11 | 12 | 0.14 | 0.15 | 2.0 | 0.009 | 0.007 | 0.045 | | 4.8 | 0.4 | | | |
| S12 | 12 | 0.16 | 0.18 | 1.8 | 0.013 | 0.006 | 0.038 | | 5.9 | 0.8 | 1.6 | | |
| S13 | 8 | 0.20 | 0.21 | 2.0 | 0.011 | 0.005 | 0.031 | 0.018 | 1.2 | 0.3 | 0.4 | 0.02 | |

| | Composition of Steel Plate [mass %] (Note 1) | | | | | Ceq [mass %] | Mechanical Properties | | |
|---|---|---|---|---|---|---|---|---|---|
| No. | Cu | B | N | O | Ca | | Yield Strength [MPa] | Tensile Strength [MPa] | vE-40 [J/cm²] |
| S1 | | | 0.0042 | 0.0018 | | 0.41 | 984 | 1141 | 55 |
| S2 | 0.006 | 0.0003 | 0.0037 | 0.0015 | | 0.55 | 1025 | 1225 | 47 |
| S3 | | | 0.0024 | 0.0024 | | 0.54 | 1102 | 1347 | 38 |
| S4 | | | 0.0056 | 0.0026 | | 0.68 | 1202 | 1534 | 32 |
| S5 | | | 0.0012 | 0.0038 | | 0.45 | 974 | 1165 | 60 |
| S6 | | | 0.0039 | 0.0012 | 0.0007 | 0.47 | 1130 | 1273 | 52 |
| S7 | 0.15 | 0.0008 | 0.0044 | 0.0010 | | 0.55 | 1123 | 1236 | 62 |
| S8 | | | 0.0016 | 0.0018 | | 0.51 | 1146 | 1284 | 59 |
| S9 | 0.92 | | 0.0049 | 0.0023 | 0.0094 | 0.85 | 1033 | 1159 | 56 |
| S10 | | 0.0016 | 0.0035 | 0.0012 | | 0.42 | 1125 | 1248 | 50 |
| S11 | | 0.0038 | 0.0040 | 0.0016 | | 0.70 | 1157 | 1394 | 36 |
| S12 | | | 0.0033 | 0.0026 | 0.0022 | 1.18 | 1342 | 1654 | 27 |
| S13 | | 0.0015 | 0.0034 | 0.0022 | | 0.73 | 1237 | 1420 | 39 |

(Note 1):
Balance is Fe and unavoidable impurities

TABLE 2

| | | Wire | Mass % Relative to Entire Mass of Welding Wire (Note 1) (Note 2) | | | | | | | | | | | | | | Ceq |
| | | | Wire Compositions | | | | | | | | | | | | | | |
| No. | Class | Type | C | Si | Mn | P | S | Al | Ti | Ni | Cr | Mo | V | Nb | Cu | B | [mass %] |
|---|---|---|---|---|---|---|---|---|---|---|---|---|---|---|---|---|---|
| W1 | Inv. ex. | SW | 0.17 | 0.28 | 1.9 | 0.013 | 0.009 | 0.036 | 0.12 | 3.3 | | | | | 0.22 | | 0.58 |
| W2 | Inv. ex. | SW | 0.22 | 0.69 | 1.9 | 0.013 | 0.007 | 0.005 | 0.05 | 3.7 | | 0.8 | | | 0.22 | | 0.85 |
| W3 | Inv. ex. | SW | 0.28 | 0.53 | 0.7 | 0.003 | 0.012 | 0.013 | 0.19 | 3.0 | | 0.5 | 0.08 | | 0.15 | | 0.61 |
| W4 | Inv. ex. | SW | 0.29 | 0.47 | 2.0 | 0.007 | 0.005 | 0.003 | 0.07 | 1.7 | 0.6 | | 0.01 | 0.003 | 0.18 | 0.0009 | 0.81 |
| W5 | Inv. ex. | SW | 0.26 | 0.80 | 3.0 | 0.015 | 0.005 | 0.006 | 0.06 | 2.0 | 0.5 | | | 0.007 | 0.26 | 0.0006 | 0.94 |
| W6 | Inv. ex. | SW | 0.26 | 1.22 | 2.6 | 0.010 | 0.008 | 0.010 | 0.01 | 1.8 | 0.6 | | | 0.003 | 0.21 | 0.0001 | 0.92 |
| W7 | Inv. ex. | SW | 0.22 | 0.57 | 1.1 | 0.019 | 0.010 | 0.011 | 0.16 | 2.5 | | 0.5 | 0.03 | | | | 0.63 |
| W8 | Inv. ex. | SW | 0.15 | 0.60 | 0.6 | 0.019 | 0.004 | 0.003 | 0.18 | 2.1 | 0.2 | 0.8 | 0.03 | | | | 0.56 |
| W9 | Inv. ex. | SW | 0.20 | 0.37 | 2.1 | 0.013 | 0.013 | 0.003 | 0.13 | 2.5 | | 0.5 | 0.06 | | | | 0.76 |
| W10 | Inv. ex. | SW | 0.19 | 0.24 | 1.7 | 0.007 | 0.012 | 0.005 | 0.13 | 4.4 | 0.3 | 0.1 | 0.03 | | 0.20 | | 0.69 |
| W11 | Inv. ex. | SW | 0.29 | 0.34 | 1.1 | 0.007 | 0.003 | 0.031 | 0.05 | 3.8 | | 0.1 | 0.07 | 0.020 | 0.14 | 0.0042 | 0.62 |
| W12 | Inv. ex. | SW | 0.39 | 0.32 | 2.3 | 0.013 | 0.009 | 0.019 | 0.04 | 4.3 | | 0.5 | 0.07 | | 0.28 | | 1.00 |
| W13 | Inv. ex. | SW | 0.20 | 0.32 | 2.1 | 0.017 | 0.008 | 0.016 | 0.01 | 2.7 | | 0.2 | | | 0.24 | | 0.67 |
| W14 | Inv. ex. | SW | 0.25 | 0.30 | 2.1 | 0.016 | 0.002 | 0.003 | 0.03 | 2.9 | 0.6 | 0.3 | | 0.016 | 0.23 | 0.0034 | 0.88 |
| W15 | Inv. ex. | SW | 0.18 | 0.25 | 2.2 | 0.016 | 0.008 | 0.005 | 0.03 | 2.5 | | 0.6 | | | | | 0.78 |
| W16 | Inv. ex. | SW | 0.20 | 0.24 | 1.7 | 0.013 | 0.005 | 0.026 | 0.06 | 2.1 | | | 0.02 | | 0.26 | | 0.55 |
| W17 | Inv. ex. | SW | 0.25 | 0.28 | 2.3 | 0.016 | 0.008 | 0.043 | 0.10 | 2.7 | | | 0.04 | | 0.16 | | 0.71 |
| W18 | Inv. ex. | SW | 0.27 | 0.35 | 1.5 | 0.013 | 0.007 | 0.008 | 0.06 | 2.0 | | | 0.02 | | 0.20 | | 0.60 |
| W19 | Inv. ex. | SW | 0.25 | 0.36 | 2.3 | 0.011 | 0.006 | 0.057 | 0.05 | 4.0 | | 0.1 | 0.02 | 0.016 | 0.11 | 0.0007 | 0.78 |
| W20 | Inv. ex. | SW | 0.22 | 0.41 | 1.6 | 0.008 | 0.003 | 0.044 | 0.10 | 3.4 | 0.3 | 0.4 | 0.04 | 0.012 | 0.14 | 0.0012 | 0.75 |
| W21 | Inv. ex. | SW | 0.27 | 0.40 | 1.9 | 0.008 | 0.003 | 0.077 | 0.05 | 3.5 | 0.6 | 0.1 | 0.02 | 0.018 | 0.15 | 0.0009 | 0.84 |
| W22 | Inv. ex. | SW | 0.30 | 0.51 | 2.3 | 0.013 | 0.005 | 0.006 | 0.11 | 3.1 | | 0.4 | | | | | 0.89 |
| W23 | Inv. ex. | SW | 0.20 | 0.49 | 2.1 | 0.009 | 0.005 | 0.010 | 0.09 | 2.5 | | 0.1 | | | | | 0.67 |
| W24 | Inv. ex. | SW | 0.18 | 0.54 | 1.8 | 0.011 | 0.006 | 0.009 | 0.13 | 2.7 | | 0.1 | | | | | 0.60 |
| W25 | Inv. ex. | SW | 0.15 | 0.29 | 1.7 | 0.014 | 0.008 | 0.029 | 0.08 | 2.6 | 1.1 | | | 0.079 | 0.63 | 0.0024 | 0.72 |
| W26 | Inv. ex. | SW | 0.17 | 0.35 | 1.5 | 0.015 | 0.003 | 0.032 | 0.10 | 3.0 | 1.5 | 0.3 | | 0.064 | 0.56 | | 0.87 |
| W27 | Inv. ex. | SW | 0.21 | 0.18 | 1.7 | 0.010 | 0.007 | 0.017 | 0.03 | 2.9 | 2.0 | 0.7 | | 0.087 | 0.88 | | 1.14 |
| W28 | Inv. ex. | SW | 0.18 | 0.24 | 1.6 | 0.014 | 0.006 | 0.033 | 0.04 | 1.3 | | 0.3 | 0.10 | | | 0.0015 | 0.57 |
| W29 | Inv. ex. | SW | 0.23 | 0.32 | 1.9 | 0.009 | 0.009 | 0.021 | | 2.0 | 0.7 | | 0.14 | | 0.20 | 0.0011 | 0.75 |
| W30 | Inv. ex. | SW | 0.18 | 0.25 | 1.5 | 0.009 | 0.006 | 0.028 | 0.08 | 1.7 | | | 0.19 | | 0.24 | 0.0015 | 0.50 |
| W31 | Inv. ex. | SW | 0.26 | 0.38 | 1.5 | 0.014 | 0.010 | 0.009 | 0.02 | 2.9 | | 0.3 | | 0.011 | 0.21 | 0.0017 | 0.66 |
| W32 | Inv. ex. | SW | 0.19 | 0.39 | 1.3 | 0.016 | 0.006 | 0.028 | 0.03 | 3.5 | | 0.5 | | | 0.21 | 0.0021 | 0.65 |
| W33 | Inv. ex. | SW | 0.28 | 0.27 | 1.6 | 0.014 | 0.003 | 0.014 | 0.10 | 6.0 | | | 0.3 | 0.04 | 0.19 | 0.0050 | 0.78 |
| W34 | Inv. ex. | SW | 0.16 | 0.22 | 1.4 | 0.005 | 0.006 | 0.031 | 0.06 | 4.2 | 0.4 | 1.1 | 0.05 | | | | 0.85 |
| W35 | Inv. ex. | SW | 0.22 | 0.29 | 1.7 | 0.012 | 0.006 | 0.006 | 0.06 | 9.9 | 0.8 | | | | 0.21 | | 0.92 |
| W36 | Inv. ex. | SW | 0.24 | 0.31 | 1.3 | 0.005 | 0.003 | 0.013 | 0.06 | 3.5 | 0.5 | 1.5 | | | 0.24 | | 1.03 |

(Note 1):
Mass % relative to entire of wire
(Note 2):
Balance is Fe and unavoidable impurities

TABLE 3

| | | Wire | Mass % Relative to Entire Mass of Welding Wire (Note 1) (Note 2) (Note 3) | | | | | | | | | | | | | | Ceq |
| | | | Wire Compositions | | | | | | | | | | | | | | |
| No. | Class | Type | C | Si | Mn | P | S | Al | Ti | Ni | Cr | Mo | V | Nb | Cu | B | [mass %] |
|---|---|---|---|---|---|---|---|---|---|---|---|---|---|---|---|---|---|
| W37 | Inv. ex. | FCW | 0.22 | 0.53 | 2.5 | 0.007 | 0.009 | 0.031 | 0.13 | 1.9 | | | | | | | 0.70 |
| W38 | Inv. ex. | FCW | 0.20 | 0.36 | 2.1 | 0.006 | 0.012 | 0.045 | 0.12 | 2.0 | 0.5 | | | | 0.20 | | 0.70 |
| W39 | Inv. ex. | FCW | 0.25 | 0.44 | 1.9 | 0.007 | 0.010 | 0.024 | 0.16 | 3.3 | | 0.3 | | | | | 0.74 |
| W40 | Inv. ex. | FCW | 0.23 | 0.78 | 3.2 | 0.015 | 0.008 | 0.018 | | 1.8 | | | 0.08 | 0.003 | 0.23 | 0.0001 | 0.85 |
| W41 | Inv. ex. | FCW | 0.16 | 0.63 | 2.4 | 0.012 | 0.008 | 0.026 | 0.05 | 2.0 | | | 0.08 | 0.007 | 0.18 | 0.0003 | 0.64 |
| W42 | Inv. ex. | FCW | 0.18 | 1.09 | 2.2 | 0.013 | 0.008 | 0.032 | 0.10 | 1.5 | | | | 0.003 | 0.18 | 0.0001 | 0.64 |
| W43 | Inv. ex. | FCW | 0.30 | 0.32 | 1.9 | 0.010 | 0.007 | 0.034 | 0.16 | 1.9 | 0.4 | 0.5 | 0.03 | | 0.00 | | 0.87 |
| W44 | Inv. ex. | FCW | 0.27 | 0.34 | 2.3 | 0.019 | 0.007 | 0.037 | 0.14 | 1.8 | | 0.8 | 0.03 | | 0.28 | | 0.93 |
| W45 | Inv. ex. | FCW | 0.30 | 0.53 | 2.5 | 0.019 | 0.008 | 0.009 | 0.10 | 2.1 | 0.2 | 0.3 | 0.08 | | 0.25 | | 0.92 |
| W46 | Inv. ex. | FCW | 0.21 | 0.39 | 2.1 | 0.013 | 0.003 | 0.019 | 0.12 | 2.4 | | 0.5 | 0.11 | | 0.23 | 0.0034 | 0.75 |
| W47 | Inv. ex. | FCW | 0.19 | 0.57 | 1.9 | 0.015 | 0.011 | 0.005 | 0.04 | 4.0 | | 0.5 | 0.11 | | | | 0.74 |
| W48 | Inv. ex. | FCW | 0.31 | 0.61 | 2.4 | 0.015 | 0.003 | 0.012 | 0.03 | 3.6 | | 0.3 | 0.10 | | 0.17 | | 0.92 |
| W49 | Inv. ex. | FCW | 0.20 | 0.45 | 1.7 | 0.008 | 0.002 | 0.033 | 0.06 | 3.2 | | 0.3 | | | 0.19 | 0.0021 | 0.67 |
| W50 | Inv. ex. | FCW | 0.15 | 0.38 | 2.4 | 0.016 | 0.008 | 0.003 | 0.04 | 2.5 | 0.3 | 0.2 | | 0.017 | | 0.0033 | 0.74 |
| W51 | Inv. ex. | FCW | 0.18 | 0.43 | 2.2 | 0.017 | 0.009 | 0.009 | 0.03 | 2.8 | | 0.3 | | | | | 0.72 |
| W52 | Inv. ex. | FCW | 0.18 | 0.78 | 1.7 | 0.013 | 0.003 | 0.032 | 0.03 | 2.1 | | | 0.02 | | | | 0.55 |
| W53 | Inv. ex. | FCW | 0.15 | 0.69 | 2.1 | 0.013 | 0.005 | 0.002 | 0.04 | 2.0 | | | 0.01 | | 0.24 | | 0.58 |
| W54 | Inv. ex. | FCW | 0.18 | 0.85 | 2.1 | 0.015 | 0.011 | 0.042 | | 2.1 | | | 0.02 | | 0.21 | | 0.61 |
| W55 | Inv. ex. | FCW | 0.20 | 0.40 | 1.9 | 0.015 | 0.010 | 0.044 | 0.10 | 3.5 | 0.4 | 0.2 | | 0.011 | 0.19 | 0.0011 | 0.78 |
| W56 | Inv. ex. | FCW | 0.25 | 0.36 | 2.5 | 0.012 | 0.009 | 0.035 | 0.02 | 3.4 | 0.2 | 0.4 | | 0.022 | 0.21 | 0.0008 | 0.89 |
| W57 | Inv. ex. | FCW | 0.25 | 0.31 | 2.3 | 0.013 | 0.002 | 0.062 | 0.08 | 3.8 | 0.3 | 0.2 | | 0.025 | 0.19 | 0.0015 | 0.86 |
| W58 | Inv. ex. | FCW | 0.20 | 0.36 | 2.3 | 0.007 | 0.009 | 0.006 | 0.15 | 2.7 | | | | | 0.13 | | 0.67 |

TABLE 3-continued

Mass % Relative to Entire Mass of Welding Wire (Note 1) (Note 2) (Note 3)

| Wire | | | Wire Compositions | | | | | | | | | | | | | Ceq |
|---|---|---|---|---|---|---|---|---|---|---|---|---|---|---|---|---|---|
| No. | Class | Type | C | Si | Mn | P | S | Al | Ti | Ni | Cr | Mo | V | Nb | Cu | B | [mass %] |
| W59 | Inv. ex. | FCW | 0.22 | 0.49 | 2.3 | 0.016 | 0.005 | 0.010 | 0.14 | 2.7 | | | | | | | 0.70 |
| W60 | Inv. ex. | FCW | 0.18 | 0.45 | 2.1 | 0.009 | 0.008 | 0.009 | 0.12 | 3.2 | | 0.3 | | | 0.14 | | 0.70 |
| W61 | Inv. ex. | FCW | 0.19 | 0.46 | 2.1 | 0.012 | 0.011 | 0.031 | 0.08 | 3.8 | 1.3 | | | 0.017 | 0.31 | | 0.92 |
| W62 | Inv. ex. | FCW | 0.17 | 0.51 | 1.8 | 0.010 | 0.011 | 0.025 | 0.05 | 4.0 | 0.8 | 0.4 | | 0.029 | 0.69 | | 0.85 |
| W63 | Inv. ex. | FCW | 0.21 | 0.63 | 1.8 | 0.016 | 0.010 | 0.001 | 0.06 | 4.2 | 0.9 | | | 0.072 | 0.25 | | 0.83 |
| W64 | Inv. ex. | FCW | 0.18 | 0.37 | 1.6 | 0.014 | 0.008 | 0.047 | 0.08 | 2.1 | | 0.16 | | | | 0.0021 | 0.54 |
| W65 | Inv. ex. | FCW | 0.21 | 0.40 | 1.6 | 0.009 | 0.009 | 0.043 | | 1.5 | | 0.04 | 0.020 | | | 0.0015 | 0.53 |
| W66 | Inv. ex. | FCW | 0.21 | 0.38 | 1.4 | 0.009 | 0.010 | 0.023 | 0.04 | 1.9 | 0.4 | 0.10 | | | | 0.0020 | 0.58 |
| W67 | Inv. ex. | FCW | 0.17 | 0.31 | 1.7 | 0.012 | 0.010 | 0.032 | 0.07 | 5.3 | | 0.7 | | | 0.23 | 0.0037 | 0.77 |
| W68 | Inv. ex. | FCW | 0.23 | 0.39 | 2.1 | 0.012 | 0.004 | 0.022 | 0.06 | 4.8 | | 0.9 | | | 0.23 | 0.0049 | 0.96 |
| W69 | Inv. ex. | FCW | 0.21 | 0.40 | 2.0 | 0.013 | 0.006 | 0.010 | 0.09 | 5.7 | | 0.9 | 0.05 | | | 0.0036 | 0.94 |
| W70 | Inv. ex. | FCW | 0.24 | 0.33 | 1.9 | 0.012 | 0.009 | 0.019 | 0.04 | 0.0 | 0.5 | 1.3 | | 0.20 | | | 1.02 |
| W71 | Inv. ex. | FCW | 0.27 | 0.27 | 1.9 | 0.012 | 0.006 | 0.031 | 0.03 | 9.8 | | 0.7 | | 0.17 | | | 1.01 |
| W72 | Inv. ex. | FCW | 0.22 | 0.38 | 1.8 | 0.008 | 0.007 | 0.030 | 0.01 | 2.6 | 1.1 | 0.8 | | | | | 1.02 |
| W73 | Inv. ex. | SW | 0.19 | 0.44 | 0.5 | 0.012 | 0.006 | 0.012 | 0.25 | 4.5 | 0.3 | 1.0 | | 0.011 | 0.33 | 0.0008 | 0.71 |
| W74 | Inv. ex. | SW | 0.24 | 0.85 | 2.1 | 0.012 | 0.009 | 0.032 | 0.06 | 3.3 | | 0.4 | 0.05 | | 0.14 | | 0.79 |
| W75 | Inv. ex. | FCW | 0.14 | 0.57 | 0.7 | 0.012 | 0.006 | 0.012 | 0.24 | 4.9 | | 1.3 | | 0.086 | | 0.0075 | 0.70 |
| W76 | Inv. ex. | FCW | 0.24 | 0.92 | 2.0 | 0.008 | 0.008 | 0.044 | 0.06 | 3.5 | 1.6 | | 0.22 | | 0.83 | | 0.98 |

(Note 1):
Mass % relative to entire of wire (Note 2):
Balance is Fe and unavoidable impurities (Note 3):
Regarding FCW, Fe powder was also added for increasing volume, as needed

TABLE 4

Mass % Relative to Entire Mass of Welding Wire (Note 1) (Note 2) (Note 3)

| Wire | | | Wire Compositions | | | | | | | | | | | | | Ceq |
|---|---|---|---|---|---|---|---|---|---|---|---|---|---|---|---|---|---|
| No. | Class | Type | C | Si | Mn | P | S | Al | Ti | Ni | Cr | Mo | V | Nb | Cu | B | [mass %] |
| W77 | Comp. ex. | SW | 0.12 | 0.78 | 2.3 | 0.006 | 0.006 | 0.036 | 0.02 | 4.1 | 1.1 | | | 0.007 | 0.25 | | 0.86 |
| W78 | Comp. ex. | SW | 0.39 | 0.38 | 1.7 | 0.013 | 0.008 | 0.025 | 0.04 | 0.9 | | 0.6 | 0.03 | | 0.20 | | 0.86 |
| W79 | Comp. ex. | SW | 0.26 | 0.13 | 2.3 | 0.016 | 0.015 | 0.036 | 0.03 | 3.2 | | 0.1 | 0.02 | | | | 0.76 |
| W80 | Comp. ex. | SW | 0.34 | 1.40 | 1.8 | 0.007 | 0.002 | 0.037 | 0.04 | 2.0 | | | | 0.005 | 0.23 | 0.0003 | 0.75 |
| W81 | Comp. ex. | SW | 0.15 | 0.37 | 0.4 | 0.007 | 0.010 | 0.037 | 0.21 | 1.6 | 0.5 | 0.3 | 0.04 | | | | 0.45 |
| W82 | Comp. ex. | SW | 0.36 | 1.22 | 3.4 | 0.015 | 0.008 | 0.007 | 0.09 | 2.3 | | | | 0.005 | 0.20 | 0.0003 | 1.04 |
| W83 | Comp. ex. | SW | 0.12 | 0.65 | 2.1 | 0.020 | 0.002 | 0.002 | 0.17 | 1.6 | | | | | | | 0.53 |
| W84 | Comp. ex. | SW | 0.28 | 0.42 | 1.9 | 0.005 | 0.004 | 0.041 | 0.03 | 6.3 | | 0.1 | | | 0.20 | 0.0028 | 0.80 |
| W85 | Comp. ex. | SW | 0.34 | 0.47 | 2.5 | 0.004 | 0.004 | 0.003 | 0.19 | 1.8 | | 0.4 | | | | | 0.93 |
| W86 | Comp. ex. | SW | 0.15 | 0.31 | 1.6 | 0.013 | 0.013 | 0.079 | 0.03 | 1.0 | 0.6 | 0.2 | 0.18 | 0.022 | 0.15 | 0.0008 | 0.65 |
| W87 | Comp. ex. | SW | 0.28 | 0.25 | 2.2 | 0.015 | 0.008 | 0.043 | | 4.1 | 1.2 | | | 0.017 | 0.36 | | 1.00 |
| W88 | Comp. ex. | SW | 0.22 | 0.26 | 0.4 | 0.001 | 0.009 | 0.004 | 0.26 | 2.2 | | 0.3 | | | | | 0.43 |
| W89 | Comp. ex. | SW | 0.25 | 0.44 | 2.3 | 0.009 | 0.011 | 0.016 | 0.01 | 1.0 | | | 0.21 | | 0.23 | | 0.68 |
| W90 | Comp. ex. | SW | 0.29 | 0.18 | 1.7 | 0.009 | 0.010 | 0.045 | 0.02 | 10.4 | 0.3 | 0.5 | | | | | 1.02 |
| W91 | Comp. ex. | SW | 0.30 | 0.51 | 2.1 | 0.008 | 0.010 | 0.028 | 0.03 | 1.2 | 2.3 | | | 0.028 | 0.33 | | 1.15 |
| W92 | Comp. ex. | SW | 0.20 | 0.14 | 1.4 | 0.009 | 0.007 | 0.019 | 0.04 | 3.6 | 0.3 | 1.6 | | | | | 0.98 |
| W93 | Comp. ex. | SW | 0.27 | 0.52 | 1.2 | 0.017 | 0.005 | 0.007 | 0.06 | 1.6 | | | 0.23 | | | 0.0016 | 0.56 |
| W94 | Comp. ex. | SW | 0.30 | 0.65 | 1.8 | 0.008 | 0.012 | 0.011 | 0.04 | 3.7 | 0.8 | | | 0.103 | 0.29 | | 0.88 |
| W95 | Comp. ex. | SW | 0.19 | 0.38 | 2.1 | 0.014 | 0.014 | 0.015 | 0.04 | 2.5 | 1.1 | | 0.05 | 0.004 | 1.08 | | 0.83 |
| W96 | Comp. ex. | SW | 0.14 | 0.16 | 2.3 | 0.010 | 0.012 | 0.045 | 0.02 | 5.9 | | 0.3 | 0.00 | | | 0.0131 | 0.74 |
| W97 | Comp. ex. | SW | 0.22 | 0.24 | 2.3 | 0.009 | 0.003 | 0.041 | 0.02 | 2.4 | 0.6 | 0.1 | 0.02 | 0.008 | 0.16 | 0.0004 | 0.82 |
| W98 | Comp. ex. | SW | 0.18 | 0.32 | 2.1 | 0.010 | 0.009 | 0.035 | 0.03 | 1.5 | | 0.3 | | | | | 0.66 |
| W99 | Comp. ex. | SW | 0.18 | 0.38 | 2.1 | 0.012 | 0.005 | 0.031 | 0.02 | 3.3 | 0.4 | | | | 0.27 | | 0.71 |
| W100 | Comp. ex. | FCW | 0.20 | 0.35 | 1.9 | 0.008 | 0.007 | 0.015 | 0.02 | 3.6 | | 0.3 | | | 0.23 | | 0.69 |
| W101 | Comp. ex. | FCW | 0.15 | 0.32 | 1.0 | 0.008 | 0.006 | 0.036 | 0.03 | 1.4 | | 0.3 | | | | | 0.45 |
| W102 | Comp. ex. | FCW | 0.39 | 0.16 | 2.8 | 0.012 | 0.005 | 0.029 | 0.02 | 2.6 | 1.2 | 1.1 | 0.02 | | | | 1.45 |
| W103 | Comp. ex. | FCW | 0.19 | 0.17 | 1.7 | 0.010 | 0.006 | 0.004 | 0.01 | 2.8 | 1.1 | | | 0.053 | 0.25 | | 0.76 |
| W104 | Comp. ex. | FCW | 0.22 | 0.20 | 2.1 | 0.012 | 0.006 | 0.051 | 0.19 | 1.9 | | | | | | | 0.62 |
| W105 | Comp. ex. | SW | 0.18 | 0.33 | 1.8 | 0.007 | 0.007 | 0.018 | 0.04 | 2.5 | | 0.8 | | 0.023 | 0.24 | 0.0020 | 0.76 |

TABLE 4-continued

| | | Wire | Mass % Relative to Entire Mass of Welding Wire (Note 1) (Note 2) (Note 3) | | | | | | | | | | | | | Ceq |
| | | | Wire Compositions | | | | | | | | | | | | | |
| No. | Class | Type | C | Si | Mn | P | S | Al | Ti | Ni | Cr | Mo | V | Nb | Cu | B | [mass %] |
|---|---|---|---|---|---|---|---|---|---|---|---|---|---|---|---|---|---|
| W106 | Comp. ex. | SW | 0.14 | 0.28 | 1.1 | 0.010 | 0.005 | 0.027 | 0.00 | 1.2 | 0.6 | 0.1 | 0.03 | | | | 0.51 |
| W107 | Comp. ex. | FCW | 0.19 | 0.33 | 1.8 | 0.005 | 0.006 | 0.018 | 0.07 | 1.5 | 1.0 | 0.5 | | | 0.30 | | 0.86 |
| W108 | Comp. ex. | FCW | 0.24 | 0.25 | 1.6 | 0.008 | 0.008 | 0.022 | 0.06 | 2.8 | 1.2 | | 0.02 | | 0.22 | | 0.83 |

(Note 1):
Mass % relative to entire of wire
(Note 2):
Balance is Fe and unavoidable impurities
(Note 3):
Regarding FCW, Fe powder was also added for increasing volume, as needed

TABLE 5

| No. | Class | Welding Wire No. | Steel Plate No. | Plate Thickness (mm) | Current (A) | Voltage (V) | Welding Speed (cm/min) | Heat Input (kJ/cm) | Preheat Temperature (° C.) | Shield gas | Laser | Laser Output (kW) |
|---|---|---|---|---|---|---|---|---|---|---|---|---|
| 1 | Inv. ex. | W1 | S1 | 4 | 230 | 24 | 120 | 2.76 | 100 | Ar—20%CO$_2$ | YAG | 5 |
| 2 | Inv. ex. | W2 | S1 | 4 | 230 | 24 | 120 | 2.76 | 100 | Ar—20%CO$_2$ | YAG | 5 |
| 3 | Inv. ex. | W3 | S1 | 4 | 230 | 24 | 120 | 2.76 | 100 | Ar—20%CO$_2$ | YAG | 5 |
| 4 | Inv. ex. | W4 | S2 | 4 | 230 | 24 | 120 | 2.76 | 100 | Ar—20%CO$_2$ | YAG | 5 |
| 5 | Inv. ex. | W5 | S2 | 4 | 230 | 24 | 120 | 2.76 | 100 | Ar—20%CO$_2$ | YAG | 5 |
| 6 | Inv. ex. | W6 | S2 | 4 | 230 | 24 | 120 | 2.76 | 100 | Ar—20%CO$_2$ | YAG | 5 |
| 7 | Inv. ex. | W7 | S3 | 4 | 230 | 24 | 120 | 2.76 | 100 | Ar—20%CO$_2$ | YAG | 5 |
| 8 | Inv. ex. | W8 | S3 | 4 | 230 | 24 | 120 | 2.76 | 100 | Ar—20%CO$_2$ | YAG | 5 |
| 9 | Inv. ex. | W9 | S3 | 4 | 230 | 24 | 120 | 2.76 | 100 | Ar—10%CO$_2$ | YAG | 5 |
| 10 | Inv. ex. | W10 | S4 | 4 | 230 | 24 | 120 | 2.76 | 100 | Ar—10%CO$_2$ | YAG | 5 |
| 11 | Inv. ex. | W11 | S4 | 4 | 230 | 24 | 100 | 3.31 | 100 | Ar—5%O$_2$ | YAG | 6 |
| 12 | Inv. ex. | W12 | S4 | 4 | 230 | 24 | 120 | 2.76 | 100 | Ar—5%O$_2$ | YAG | 5 |
| 13 | Inv. ex. | W13 | S5 | 8 | 250 | 27 | 100 | 4.05 | 100 | Ar—20%CO$_2$ | YAG | 8 |
| 14 | Inv. ex. | W14 | S5 | 8 | 250 | 27 | 100 | 4.05 | 100 | Ar—20%CO$_2$ | YAG | 8 |
| 15 | Inv. ex. | W15 | S5 | 8 | 250 | 27 | 100 | 4.05 | 100 | Ar—20%CO$_2$ | YAG | 8 |
| 16 | Inv. ex. | W16 | S6 | 8 | 250 | 27 | 100 | 4.05 | 100 | Ar—20%CO$_2$ | YAG | 8 |
| 17 | Inv. ex. | W17 | S6 | 8 | 250 | 27 | 100 | 4.05 | 100 | Ar—20%CO$_2$ | YAG | 8 |
| 18 | Inv. ex. | W18 | S6 | 8 | 250 | 27 | 100 | 4.05 | 100 | Ar—20%CO$_2$ | YAG | 8 |
| 19 | Inv. ex. | W19 | S7 | 8 | 250 | 27 | 100 | 4.05 | 100 | Ar—20%CO$_2$ | YAG | 8 |
| 20 | Inv. ex. | W20 | S7 | 8 | 250 | 27 | 100 | 4.05 | 100 | Ar—20%CO$_2$ | YAG | 8 |
| 21 | Inv. ex. | W21 | S7 | 8 | 250 | 27 | 120 | 3.38 | 100 | Ar—5%CO$_2$ | YAG | 7 |
| 22 | Inv. ex. | W22 | S8 | 8 | 250 | 27 | 100 | 4.05 | 100 | Ar—5%CO$_2$ | YAG | 8 |
| 23 | Inv. ex. | W23 | S8 | 8 | 250 | 27 | 100 | 4.05 | 100 | Ar—2%O$_2$ | YAG | 8 |
| 24 | Inv. ex. | W24 | S8 | 8 | 250 | 27 | 100 | 4.05 | 100 | Ar—2%O$_2$ | YAG | 8 |
| 25 | Inv. ex. | W25 | S9 | 12 | 270 | 28 | 100 | 4.54 | 125 | Ar—20%CO$_2$ | YAG | 11 |
| 26 | Inv. ex. | W26 | S9 | 12 | 270 | 28 | 100 | 4.54 | 125 | Ar—20%CO$_2$ | YAG | 11 |
| 27 | Inv. ex. | W27 | S9 | 12 | 270 | 28 | 100 | 4.54 | 125 | Ar—20%CO$_2$ | YAG | 11 |
| 28 | Inv. ex. | W28 | S10 | 12 | 270 | 28 | 100 | 4.54 | 125 | Ar—20%CO$_2$ | YAG | 11 |
| 29 | Inv. ex. | W29 | S10 | 12 | 270 | 28 | 100 | 4.54 | 125 | Ar—20%CO$_2$ | YAG | 11 |
| 30 | Inv. ex. | W30 | S10 | 12 | 270 | 28 | 100 | 4.54 | 125 | Ar—20%CO$_2$ | YAG | 11 |
| 31 | Inv. ex. | W31 | S11 | 12 | 270 | 28 | 100 | 4.54 | 125 | Ar—20%CO$_2$ | YAG | 11 |
| 32 | Inv. ex. | W32 | S11 | 12 | 270 | 28 | 100 | 4.54 | 125 | Ar—20%CO$_2$ | YAG | 11 |
| 33 | Inv. ex. | W33 | S11 | 12 | 270 | 28 | 100 | 4.54 | 125 | Ar—25%CO$_2$ | YAG | 11 |
| 34 | Inv. ex. | W34 | S12 | 12 | 270 | 28 | 100 | 4.54 | 125 | Ar—25%CO$_2$ | YAG | 11 |
| 35 | Inv. ex. | W35 | S12 | 12 | 270 | 28 | 100 | 4.54 | 125 | He—2%O$_2$ | YAG | 11 |
| 36 | Inv. ex. | W36 | S12 | 12 | 270 | 28 | 100 | 4.54 | 125 | He—5%O$_2$ | YAG | 11 |

TABLE 6

| No. | Class | Welding Wire No. | Steel Plate No. | Plate Thickness (mm) | Current (A) | Voltage (V) | Welding Speed (cm/min) | Heat Input (kJ/cm) | Preheat Temperature (° C.) | Shield gas | Laser | Laser Output (kW) |
|---|---|---|---|---|---|---|---|---|---|---|---|---|
| 37 | Inv. ex. | W37 | S1 | 4 | 230 | 24 | 120 | 2.76 | 100 | Ar—20%CO$_2$ | YAG | 5 |
| 38 | Inv. ex. | W38 | S1 | 4 | 230 | 24 | 120 | 2.76 | 100 | Ar—20%CO$_2$ | YAG | 5 |
| 39 | Inv. ex. | W39 | S1 | 4 | 230 | 24 | 120 | 2.76 | 100 | Ar—20%CO$_2$ | YAG | 5 |
| 40 | Inv. ex. | W40 | S2 | 4 | 230 | 24 | 120 | 2.76 | 100 | Ar—20%CO$_2$ | YAG | 5 |
| 41 | Inv. ex. | W41 | S2 | 4 | 230 | 24 | 120 | 2.76 | 100 | Ar—20%CO$_2$ | YAG | 5 |
| 42 | Inv. ex. | W42 | S2 | 4 | 230 | 24 | 120 | 2.76 | 100 | Ar—20%CO$_2$ | YAG | 5 |
| 43 | Inv. ex. | W43 | S3 | 4 | 230 | 24 | 120 | 2.76 | 100 | Ar—20%CO$_2$ | YAG | 5 |
| 44 | Inv. ex. | W44 | S3 | 4 | 230 | 24 | 120 | 2.76 | 100 | Ar—20%CO$_2$ | YAG | 5 |
| 45 | Inv. ex. | W45 | S3 | 4 | 230 | 24 | 120 | 2.76 | 100 | Ar—10%CO$_2$ | YAG | 5 |
| 46 | Inv. ex. | W46 | S4 | 4 | 230 | 24 | 120 | 2.76 | 100 | Ar—10%CO$_2$ | YAG | 5 |

TABLE 6-continued

| No. | Class | Welding Wire No. | Steel Plate No. | Plate Thickness (mm) | Current (A) | Voltage (V) | Welding Speed (cm/min) | Heat Input (kJ/cm) | Preheat Temperature (°C.) | Shield gas | Laser | Laser Output (kW) |
|---|---|---|---|---|---|---|---|---|---|---|---|---|
| 47 | Inv. ex. | W47 | S4 | 4 | 230 | 24 | 120 | 2.76 | 100 | Ar | YAG | 5 |
| 48 | Inv. ex. | W48 | S4 | 4 | 230 | 24 | 120 | 2.76 | 100 | Ar | YAG | 5 |
| 49 | Inv. ex. | W49 | S5 | 8 | 250 | 27 | 100 | 4.05 | 100 | Ar—20%$CO_2$ | YAG | 8 |
| 50 | Inv. ex. | W50 | S5 | 8 | 250 | 27 | 100 | 4.05 | 100 | Ar—20%$CO_2$ | YAG | 8 |
| 51 | Inv. ex. | W51 | S5 | 8 | 250 | 27 | 100 | 4.05 | 100 | Ar—20%$CO_2$ | YAG | 8 |
| 52 | Inv. ex. | W52 | S6 | 8 | 250 | 27 | 100 | 4.05 | 100 | Ar—20%$CO_2$ | YAG | 8 |
| 53 | Inv. ex. | W53 | S6 | 8 | 250 | 27 | 100 | 4.05 | 100 | Ar—20%$CO_2$ | YAG | 8 |
| 54 | Inv. ex. | W54 | S6 | 8 | 250 | 27 | 120 | 3.38 | 100 | Ar—20%$CO_2$ | YAG | 7 |
| 55 | Inv. ex. | W55 | S7 | 8 | 250 | 27 | 100 | 4.05 | 100 | Ar—20%$CO_2$ | YAG | 8 |
| 56 | Inv. ex. | W56 | S7 | 8 | 250 | 27 | 100 | 4.05 | 100 | Ar—20%$CO_2$ | YAG | 8 |
| 57 | Inv. ex. | W57 | S7 | 8 | 250 | 27 | 100 | 4.05 | 100 | Ar—5%$CO_2$ | YAG | 8 |
| 58 | Inv. ex. | W58 | S8 | 8 | 250 | 27 | 100 | 4.05 | 100 | Ar—5%$CO_2$ | YAG | 8 |
| 59 | Inv. ex. | W59 | S8 | 8 | 250 | 27 | 100 | 4.05 | 100 | Ar—5%$O_2$ | YAG | 8 |
| 60 | Inv. ex. | W60 | S8 | 8 | 250 | 27 | 100 | 4.05 | 100 | Ar—5%$O_2$ | YAG | 8 |
| 61 | Inv. ex. | W61 | S9 | 12 | 270 | 28 | 100 | 4.54 | 125 | Ar—20%$CO_2$ | YAG | 11 |
| 62 | Inv. ex. | W62 | S9 | 12 | 270 | 28 | 100 | 4.54 | 125 | Ar—20%$CO_2$ | YAG | 11 |
| 63 | Inv. ex. | W63 | S9 | 12 | 270 | 28 | 100 | 4.54 | 125 | Ar—20%$CO_2$ | YAG | 11 |
| 64 | Inv. ex. | W64 | S10 | 12 | 270 | 28 | 100 | 4.54 | 125 | Ar—20%$CO_2$ | YAG | 11 |
| 65 | Inv. ex. | W65 | S10 | 12 | 270 | 28 | 100 | 4.54 | 125 | Ar—20%$CO_2$ | YAG | 11 |
| 66 | Inv. ex. | W66 | S10 | 12 | 270 | 28 | 100 | 4.54 | 125 | Ar—20%$CO_2$ | YAG | 11 |
| 67 | Inv. ex. | W67 | S11 | 12 | 270 | 28 | 100 | 4.54 | 125 | Ar—20%$CO_2$ | YAG | 11 |
| 68 | Inv. ex. | W68 | S11 | 12 | 270 | 28 | 100 | 4.54 | 125 | Ar—20%$CO_2$ | YAG | 11 |
| 69 | Inv. ex. | W69 | S11 | 12 | 270 | 28 | 100 | 4.54 | 125 | Ar—25%$CO_2$ | YAG | 11 |
| 70 | Inv. ex. | W70 | S12 | 12 | 270 | 28 | 100 | 4.54 | 125 | Ar—25%$CO_2$ | YAG | 11 |
| 71 | Inv. ex. | W71 | S12 | 12 | 270 | 28 | 100 | 4.54 | 125 | He—2%$O_2$ | YAG | 11 |
| 72 | Inv. ex. | W72 | S12 | 12 | 270 | 28 | 80 | 5.67 | 125 | He—5%$O_2$ | YAG | 12 |
| 73 | Inv. ex. | W73 | S13 | 8 | 250 | 27 | 100 | 4.05 | 100 | Ar—10%$CO_2$ | YAG | 8 |
| 74 | Inv. ex. | W74 | S13 | 8 | 250 | 27 | 100 | 4.05 | 100 | Ar—20%$CO_2$ | YAG | 8 |
| 75 | Inv. ex. | W75 | S13 | 8 | 250 | 27 | 100 | 4.05 | 100 | Ar—5%$CO_2$ | YAG | 8 |
| 76 | Inv. ex. | W76 | S13 | 8 | 250 | 27 | 100 | 4.05 | 100 | Ar—20%$CO_2$ | YAG | 8 |

TABLE 7

| No. | Class | Welding Wire No. | Steel Plate No. | Plate Thickness (mm) | Current (A) | Voltage (V) | Welding Speed (cm/min) | Heat Input (kJ/cm) | Preheat Temperature (°C.) | Shield gas | Laser | Laser Output (kW) |
|---|---|---|---|---|---|---|---|---|---|---|---|---|
| 77 | Comp. ex. | W77 | S9 | 12 | 270 | 28 | 100 | 4.54 | 125 | Ar—20%$CO_2$ | YAG | 11 |
| 78 | Comp. ex. | W78 | S4 | 4 | 230 | 24 | 120 | 2.76 | 100 | Ar—20%$CO_2$ | YAG | 5 |
| 79 | Comp. ex. | W79 | S4 | 4 | 230 | 24 | 120 | 2.76 | 100 | Ar—20%$CO_2$ | YAG | 5 |
| 80 | Comp. ex. | W80 | S2 | 4 | 230 | 24 | 120 | 2.76 | 100 | Ar—20%$CO_2$ | YAG | 5 |
| 81 | Comp. ex. | W81 | S3 | 4 | 230 | 24 | 120 | 2.76 | 100 | Ar—20%$CO_2$ | YAG | 5 |
| 82 | Comp. ex. | W82 | S2 | 4 | 230 | 24 | 120 | 2.76 | 100 | Ar—20%$CO_2$ | YAG | 5 |
| 83 | Comp. ex. | W83 | S1 | 4 | 230 | 24 | 120 | 2.76 | 100 | Ar—20%$CO_2$ | YAG | 5 |
| 84 | Comp. ex. | W84 | S11 | 12 | 270 | 28 | 100 | 4.54 | 125 | Ar—20%$CO_2$ | YAG | 11 |
| 85 | Comp. ex. | W85 | S8 | 8 | 250 | 27 | 100 | 4.05 | 100 | Ar—20%$CO_2$ | YAG | 8 |
| 86 | Comp. ex. | W86 | S7 | 8 | 250 | 27 | 100 | 4.05 | 100 | Ar—20%$CO_2$ | YAG | 8 |
| 87 | Comp. ex. | W87 | S9 | 12 | 270 | 28 | 100 | 4.54 | 125 | Ar—20%$CO_2$ | YAG | 11 |
| 88 | Comp. ex. | W88 | S1 | 4 | 230 | 24 | 120 | 2.76 | 100 | Ar—20%$CO_2$ | YAG | 5 |
| 89 | Comp. ex. | W89 | S6 | 8 | 250 | 27 | 100 | 4.05 | 100 | Ar—20%$CO_2$ | YAG | 8 |
| 90 | Comp. ex. | W90 | S12 | 12 | 270 | 28 | 100 | 4.54 | 125 | Ar—20%$CO_2$ | YAG | 11 |
| 91 | Comp. ex. | W91 | S9 | 12 | 270 | 28 | 100 | 4.54 | 125 | Ar—20%$CO_2$ | YAG | 11 |
| 92 | Comp. ex. | W92 | S12 | 12 | 270 | 28 | 100 | 4.54 | 125 | Ar—20%$CO_2$ | YAG | 11 |
| 93 | Comp. ex. | W93 | S10 | 12 | 270 | 28 | 100 | 4.54 | 125 | Ar—20%$CO_2$ | YAG | 11 |
| 94 | Comp. ex. | W94 | S9 | 12 | 270 | 28 | 100 | 4.54 | 125 | Ar—20%$CO_2$ | YAG | 11 |
| 95 | Comp. ex. | W95 | S9 | 12 | 270 | 28 | 100 | 4.54 | 125 | Ar—20%$CO_2$ | YAG | 11 |
| 96 | Comp. ex. | W96 | S11 | 12 | 270 | 28 | 100 | 4.54 | 125 | Ar—20%$CO_2$ | YAG | 11 |
| 97 | Comp. ex. | W97 | S7 | 8 | 250 | 27 | 100 | 4.05 | 100 | Ar—1%$O_2$ | YAG | 8 |
| 98 | Comp. ex. | W98 | S5 | 8 | 250 | 27 | 100 | 4.05 | 100 | Ar—10%$O_2$ | YAG | 8 |
| 99 | Comp. ex. | W99 | S6 | 8 | 250 | 27 | 100 | 4.05 | 100 | Ar—2%$CO_2$ | YAG | 8 |
| 100 | Comp. ex. | W100 | S6 | 8 | 250 | 27 | 100 | 4.05 | 100 | Ar—50%$CO_2$ | YAG | 8 |
| 101 | Comp. ex. | W101 | S5 | 8 | 250 | 27 | 100 | 4.05 | 100 | Ar—20%$CO_2$ | YAG | 8 |
| 102 | Comp. ex. | W102 | S4 | 4 | 230 | 24 | 120 | 2.76 | 100 | Ar—20%$CO_2$ | YAG | 5 |
| 103 | Comp. ex. | W103 | S9 | 12 | 270 | 28 | 100 | 4.54 | 125 | Ar—20%$CO_2$ | YAG | 11 |
| 104 | Comp. ex. | W104 | S1 | 4 | 230 | 24 | 120 | 2.76 | 100 | Ar—20%$CO_2$ | YAG | 5 |
| 105 | Comp. ex. | W105 | S13 | 8 | 250 | 27 | 140 | 2.89 | 100 | Ar—20%$CO_2$ | YAG | 8 |
| 106 | Comp. ex. | W106 | S13 | 8 | 250 | 27 | 65 | 6.23 | 100 | Ar—20%$CO_2$ | YAG | 8 |
| 107 | Comp. ex. | W107 | S13 | 8 | 250 | 27 | 100 | 4.05 | 100 | Ar—20%$CO_2$ | YAG | 5 |
| 108 | Comp. ex. | W108 | S13 | 8 | 250 | 27 | 100 | 4.05 | 100 | Ar—20%$CO_2$ | YAG | 14 |

In relation to welding joints Nos. 1 to 108 which were obtained in this way, compositions of (alloy contents), yield strength, tensile strength, toughness (vE-40) and Vickers hardness of the weld metal were investigated. A result thereof is represented by Nos. 1 to 108 in Tables 8 to 13.

Figure 4:
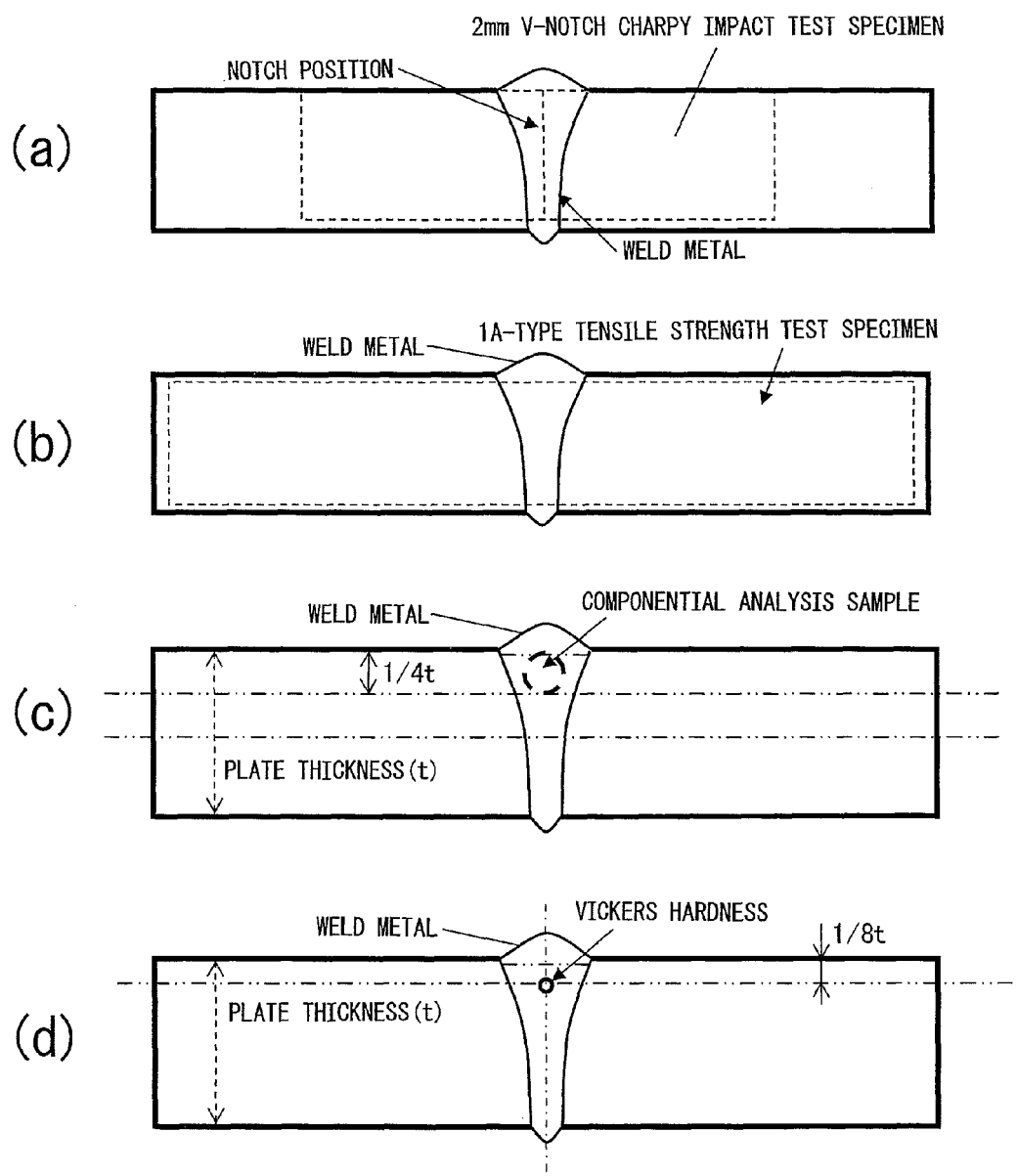
FIG. 4 is a schematic cross-sectional view which explains an operation for sampling a tensile test piece, a Charpy impact test piece and a componential analysis sample for measuring tensile strength, toughness and compositions of the welded joint, respectively; and an operation for measuring Vickers hardness.

Regarding the componental analysis of the weld metal, as shown in section (c) of FIG. 4, an analysis sample was sampled from a portion between the steel plate surface and where is separated from the surface by a quarter of the plate thickness, the portion being generally the center in the width direction of the weld metal, and then, the composition of the weld metal is measured.

The yield strength and the tensile strength were measured in conformity to JIS Z 3121 "Methods of Tensile Test for Butt Welded Joints," wherein a 1A-type test specimen was sampled and evaluated as shown in section (b) of FIG. 4. The sample having the tensile strength of 1100 MPa or more in the joint tensile test was considered to be "pass."

The toughness (vE-40) was measured in conformity to JIS Z 3128 "Methods of Impact Test for Welded Joints," wherein a Charpy impact test specimen was sampled from the welded joint, and absorbed energy thereof at -40 degrees C. was measured. Section (a) of FIG. 4 shows a cross-section of the Charpy impact test specimen used to measure the toughness of the welded joint. As shown in section (a) of FIG. 4, in the Charpy impact test specimen, a portion which penetrates the weld metal in the plate thickness direction was referred to as a notch position, and V-shaped groove having the depth of 2 mm (not shown) was formed as a notch. When a full-size Charpy impact test specimen could not be sampled due to the plate thickness, a sub-size test specimen was sampled. The absorbed energy measured in the sub-size test specimen was evaluated after being converted into absorbed energy per square centimeter. In this example, a 10 mm full-size Charpy test specimen was sampled when the plate thickness is 12 mm, a 5 mm sub-size Charpy test specimen was sampled when the plate thickness is 8 mm, and a 2.5 mm sub-size Charpy test specimen was sampled when the plate thickness is 4 mm. The sample having the absorbed energy of 27 J/cm$^2$ or more in the Charpy impact test at -40 degrees C. was considered to be "pass."

As shown in section (d) of FIG. 4, the Vickers hardness of the weld metal was measured with a load of 10 kg, at a point where is separated from the surface by one-eighth of the plate thickness, the point being generally the center in the width direction of the weld metal.

As a method for judging whether the weld metal obtained by the laser hybrid welding is the almost full martensite, a judging method by using a hardness equation of as-quenched 100% martensite, as represented by well known equation (4), was employed. It is known that the hardness of the as-quenched martensite of low-alloy steel depends almost on an amount of C, and influence of the other alloy elements is small. When the difference between the hardness calculated by this equation and the measured hardness of the weld metal was small, the weld metal is considered to be the almost full martensite.

In the actual weld metal, several percent of retained austenite is generated between laths of the martensite structure. As a ratio of the retained austenite increases, the hardness is significantly deteriorated. However, when the ratio of the retained austenite is several percent, the hardness is not substantially different from the hardness calculated by the hardness equation of 100% martensite structure. Therefore, the weld metal, including the retained austenite which does not give rise to the difference of the hardness, is treated as the almost full martensite structure. When a value obtained by subtracting the hardness of the martensite calculated by equation (4) from the Vickers hardness measurement result of the weld metal is -20 or more, the obtained weld metal was judged to be the almost full martensite, i.e., "Good."

$$[\text{Hardness of Martensite Structure}]=884\times[C]\times(1-0.3\times[C]^2)+294 \qquad (4)$$

In this equation, character "[ ]" represent contents (mass %) of elements.

TABLE 8

| No. | Welding Class | Welding Wire | Steel Plate | Chemical Composition of Weld Metal of Welded Joint (mass %) (Note 1) | | | | | | | |
|---|---|---|---|---|---|---|---|---|---|---|---|
| | | | | C | Si | Mn | P | S | Al | Ti | Ni |
| 1 | Inv. ex. | W1 | S1 | 0.12 | 0.22 | 1.5 | 0.014 | 0.007 | 0.028 | 0.116 | 2.2 |
| 2 | Inv. ex. | W2 | S1 | 0.14 | 0.43 | 1.5 | 0.014 | 0.006 | 0.008 | 0.089 | 2.5 |
| 3 | Inv. ex. | W3 | S1 | 0.16 | 0.35 | 0.9 | 0.007 | 0.009 | 0.013 | 0.145 | 2.0 |
| 4 | Inv. ex. | W4 | S2 | 0.15 | 0.56 | 1.9 | 0.007 | 0.005 | 0.013 | 0.037 | 1.1 |
| 5 | Inv. ex. | W5 | S2 | 0.14 | 0.73 | 2.4 | 0.012 | 0.005 | 0.015 | 0.031 | 1.3 |
| 6 | Inv. ex. | W6 | S2 | 0.14 | 0.95 | 2.2 | 0.009 | 0.007 | 0.018 | 0.013 | 1.2 |
| 7 | Inv. ex. | W7 | S3 | 0.15 | 0.34 | 0.8 | 0.014 | 0.007 | 0.023 | 0.125 | 1.8 |
| 8 | Inv. ex. | W8 | S3 | 0.12 | 0.36 | 0.5 | 0.014 | 0.003 | 0.018 | 0.130 | 1.5 |
| 9 | Inv. ex. | W9 | S3 | 0.14 | 0.24 | 1.3 | 0.010 | 0.009 | 0.018 | 0.112 | 1.8 |
| 10 | Inv. ex. | W10 | S4 | 0.16 | 0.16 | 1.5 | 0.008 | 0.009 | 0.015 | 0.049 | 3.5 |
| 11 | Inv. ex. | W11 | S4 | 0.20 | 0.21 | 1.2 | 0.008 | 0.003 | 0.032 | 0.021 | 3.1 |
| 12 | Inv. ex. | W12 | S4 | 0.24 | 0.20 | 1.8 | 0.012 | 0.007 | 0.024 | 0.017 | 3.4 |
| 13 | Inv. ex. | W13 | S5 | 0.12 | 0.24 | 1.6 | 0.014 | 0.007 | 0.028 | 0.008 | 2.1 |
| 14 | Inv. ex. | W14 | S5 | 0.14 | 0.23 | 1.6 | 0.013 | 0.003 | 0.019 | 0.016 | 2.3 |
| 15 | Inv. ex. | W15 | S5 | 0.11 | 0.20 | 1.7 | 0.013 | 0.007 | 0.020 | 0.017 | 2.0 |
| 16 | Inv. ex. | W16 | S6 | 0.13 | 0.24 | 1.5 | 0.012 | 0.005 | 0.025 | 0.031 | 1.5 |
| 17 | Inv. ex. | W17 | S6 | 0.15 | 0.26 | 1.8 | 0.014 | 0.007 | 0.037 | 0.049 | 1.9 |
| 18 | Inv. ex. | W18 | S6 | 0.16 | 0.30 | 1.4 | 0.012 | 0.006 | 0.012 | 0.031 | 1.4 |
| 19 | Inv. ex. | W19 | S7 | 0.14 | 0.22 | 1.8 | 0.011 | 0.006 | 0.064 | 0.025 | 3.5 |
| 20 | Inv. ex. | W20 | S7 | 0.13 | 0.25 | 1.4 | 0.009 | 0.004 | 0.055 | 0.044 | 3.1 |
| 21 | Inv. ex. | W21 | S7 | 0.15 | 0.24 | 1.6 | 0.009 | 0.004 | 0.078 | 0.025 | 3.2 |
| 22 | Inv. ex. | W22 | S8 | 0.16 | 0.32 | 1.8 | 0.012 | 0.005 | 0.005 | 0.095 | 2.4 |
| 23 | Inv. ex. | W23 | S8 | 0.12 | 0.31 | 1.7 | 0.009 | 0.005 | 0.008 | 0.084 | 2.0 |
| 24 | Inv. ex. | W24 | S8 | 0.11 | 0.34 | 1.5 | 0.011 | 0.006 | 0.007 | 0.103 | 2.1 |
| 25 | Inv. ex. | W25 | S9 | 0.091 | 0.31 | 1.8 | 0.012 | 0.007 | 0.031 | 0.038 | 2.4 |
| 26 | Inv. ex. | W26 | S9 | 0.10 | 0.36 | 1.7 | 0.013 | 0.003 | 0.033 | 0.043 | 2.7 |
| 27 | Inv. ex. | W27 | S9 | 0.12 | 0.23 | 1.8 | 0.009 | 0.006 | 0.022 | 0.012 | 2.6 |
| 28 | Inv. ex. | W28 | S10 | 0.12 | 0.24 | 1.6 | 0.012 | 0.006 | 0.028 | 0.028 | 1.0 |

TABLE 8-continued

| No. | | | | | | | | | | |
|---|---|---|---|---|---|---|---|---|---|---|
| 29 | Inv. ex. | W29 | S10 | 0.14 | 0.30 | 1.8 | 0.008 | 0.008 | 0.019 | 0.012 | 1.5 |
| 30 | Inv. ex. | W30 | S10 | 0.12 | 0.25 | 1.5 | 0.008 | 0.006 | 0.024 | 0.046 | 1.3 |
| 31 | Inv. ex. | W31 | S11 | 0.15 | 0.32 | 1.6 | 0.013 | 0.009 | 0.018 | 0.009 | 3.4 |
| 32 | Inv. ex. | W32 | S11 | 0.12 | 0.33 | 1.5 | 0.014 | 0.006 | 0.032 | 0.013 | 3.8 |
| 33 | Inv. ex. | W33 | S11 | 0.16 | 0.24 | 1.7 | 0.013 | 0.004 | 0.022 | 0.043 | 5.7 |
| 34 | Inv. ex. | W34 | S12 | 0.11 | 0.21 | 1.5 | 0.007 | 0.006 | 0.033 | 0.028 | 4.6 |
| 35 | Inv. ex. | W35 | S12 | 0.14 | 0.26 | 1.7 | 0.012 | 0.006 | 0.014 | 0.026 | 8.9 |
| 36 | Inv. ex. | W36 | S12 | 0.15 | 0.28 | 1.4 | 0.007 | 0.004 | 0.019 | 0.026 | 4.1 |

| | Chemical Composition of Weld Metal of Welded Joint (mass %) (Note 1) | | | | | | | | |
|---|---|---|---|---|---|---|---|---|---|
| No. | Cr | Mo | V | Nb | Cu | B | N | O | Ceq [mass %] | Y-value [mass %] |
| 1 | | | | | | | 0.035 | 0.016 | 0.43 | 0.187 |
| 2 | | 0.5 | | | 0.14 | | 0.054 | 0.012 | 0.60 | 0.145 |
| 3 | | 0.3 | 0.05 | | 0.10 | | 0.047 | 0.011 | 0.45 | 0.189 |
| 4 | 0.4 | | 0.006 | 0.004 | 0.12 | 0.0007 | 0.030 | 0.009 | 0.60 | 0.112 |
| 5 | 0.3 | | | 0.006 | 0.17 | 0.0005 | 0.036 | 0.006 | 0.66 | 0.124 |
| 6 | 0.4 | | | 0.004 | 0.14 | 0.0002 | 0.057 | 0.008 | 0.66 | 0.110 |
| 7 | 0.1 | 0.6 | 0.04 | | | | 0.058 | 0.027 | 0.52 | 0.177 |
| 8 | 0.2 | 0.8 | 0.04 | | | | 0.045 | 0.017 | 0.50 | 0.170 |
| 9 | 0.1 | 0.6 | 0.06 | | | | 0.034 | 0.020 | 0.59 | 0.169 |
| 10 | 0.2 | 0.2 | 0.04 | | 0.13 | | 0.031 | 0.016 | 0.60 | 0.106 |
| 11 | | 0.2 | 0.06 | 0.013 | 0.09 | 0.0027 | 0.053 | 0.016 | 0.54 | 0.088 |
| 12 | | 0.4 | 0.06 | | 0.18 | | 0.039 | 0.014 | 0.74 | 0.091 |
| 13 | | 0.2 | | | 0.17 | | 0.052 | 0.014 | 0.50 | 0.082 |
| 14 | 0.4 | 0.3 | | 0.011 | 0.16 | 0.0024 | 0.045 | 0.009 | 0.63 | 0.081 |
| 15 | | 0.5 | | | | | 0.058 | 0.020 | 0.58 | 0.085 |
| 16 | | | 0.02 | | 0.18 | | 0.052 | 0.006 | 0.43 | 0.100 |
| 17 | | | 0.03 | | 0.11 | | 0.034 | 0.015 | 0.51 | 0.138 |
| 18 | | | 0.02 | | 0.14 | | 0.033 | 0.025 | 0.44 | 0.086 |
| 19 | 0.1 | 0.1 | 0.02 | 0.018 | 0.12 | 0.0007 | 0.040 | 0.020 | 0.58 | 0.140 |
| 20 | 0.3 | 0.3 | 0.03 | 0.015 | 0.14 | 0.0011 | 0.040 | 0.026 | 0.59 | 0.140 |
| 21 | 0.5 | 0.1 | 0.02 | 0.019 | 0.15 | 0.0009 | 0.048 | 0.017 | 0.63 | 0.149 |
| 22 | | 0.4 | | | | | 0.052 | 0.018 | 0.63 | 0.153 |
| 23 | | 0.2 | | | | | 0.054 | 0.006 | 0.52 | 0.142 |
| 24 | | 0.2 | | | | | 0.050 | 0.013 | 0.48 | 0.156 |
| 25 | 1.2 | | | 0.089 | 0.70 | 0.0018 | 0.042 | 0.007 | 0.70 | 0.122 |
| 26 | 1.5 | 0.2 | | 0.078 | 0.65 | | 0.029 | 0.022 | 0.82 | 0.128 |
| 27 | 1.9 | 0.5 | | 0.095 | 0.89 | | 0.030 | 0.011 | 1.00 | 0.085 |
| 28 | | 0.2 | 0.12 | | | 0.0015 | 0.030 | 0.018 | 0.48 | 0.102 |
| 29 | 0.5 | | 0.15 | | 0.15 | 0.0012 | 0.048 | 0.025 | 0.60 | 0.084 |
| 30 | | | 0.19 | | 0.18 | 0.0015 | 0.035 | 0.007 | 0.43 | 0.114 |
| 31 | | 0.3 | | 0.008 | 0.16 | 0.0022 | 0.031 | 0.026 | 0.59 | 0.075 |
| 32 | | 0.5 | | | 0.16 | 0.0025 | 0.038 | 0.007 | 0.60 | 0.091 |
| 33 | | 0.3 | 0.03 | | 0.14 | 0.0047 | 0.030 | 0.027 | 0.67 | 0.114 |
| 34 | 0.5 | 1.2 | 0.04 | | | | 0.054 | 0.025 | 0.89 | 0.104 |
| 35 | 0.8 | 0.4 | | | 0.16 | | 0.056 | 0.028 | 0.92 | 0.089 |
| 36 | 0.6 | 1.5 | | | 0.18 | | 0.052 | 0.016 | 0.99 | 0.087 |

(Note 1):
Balance is Fe and unavoidable impurities

TABLE 9

(Rest of Table 8)

| | Mechanical Properties of Welded Joint | | | Hardness of Weld Metal | | | Cross-Sectional Shape of Welded Joint | | |
|---|---|---|---|---|---|---|---|---|---|
| No. | Yield Strength [MPa] | Tensile Strength [MPa] | vE-40 [J/cm$^2$] | Vickers Hardness [Hv] | (eq. 4) Martensite Hardness [Hv] | Martensite Judgment | W1 [mm] | W2 [mm] | Total Judgment |
| 1 | 999 | 1289 | 41 | 413 | 400 | OK | 3.6 | 1.0 | Pass |
| 2 | 1078 | 1347 | 60 | 431 | 417 | OK | 4.2 | 1.9 | Pass |
| 3 | 1016 | 1341 | 40 | 428 | 434 | OK | 5.3 | 2.0 | Pass |
| 4 | 1115 | 1319 | 51 | 428 | 426 | OK | 5.1 | 0.9 | Pass |
| 5 | 1096 | 1325 | 57 | 429 | 417 | OK | 5.2 | 1.9 | Pass |
| 6 | 1143 | 1339 | 50 | 434 | 417 | OK | 3.6 | 1.5 | Pass |
| 7 | 1019 | 1244 | 49 | 411 | 426 | OK | 4.5 | 1.0 | Pass |
| 8 | 1015 | 1209 | 55 | 388 | 400 | OK | 5.4 | 1.4 | Pass |
| 9 | 1004 | 1293 | 51 | 426 | 417 | OK | 4.4 | 1.8 | Pass |
| 10 | 1090 | 1342 | 48 | 440 | 434 | OK | 4.7 | 1.5 | Pass |
| 11 | 1283 | 1480 | 36 | 482 | 469 | OK | 6.9 | 2.4 | Pass |
| 12 | 1353 | 1534 | 36 | 497 | 502 | OK | 5.8 | 1.5 | Pass |

TABLE 9-continued (Rest of Table 8)

| | Mechanical Properties of Welded Joint | | | Hardness of Weld Metal | | | Cross-Sectional Shape of Welded Joint | | |
|---|---|---|---|---|---|---|---|---|---|
| No. | Yield Strength [MPa] | Tensile Strength [MPa] | vE-40 [J/cm$^2$] | Vickers Hardness [Hv] | (eq. 4) Martensite Hardness [Hv] | Martensite Judgment | W1 [mm] | W2 [mm] | Total Judgment |
| 13 | 1078 | 1266 | 40 | 414 | 400 | OK | 4.5 | 1.1 | Pass |
| 14 | 1002 | 1246 | 41 | 403 | 417 | OK | 5.1 | 0.7 | Pass |
| 15 | 911 | 1160 | 39 | 380 | 391 | OK | 4.1 | 1.7 | Pass |
| 16 | 899 | 1216 | 49 | 390 | 408 | OK | 4.6 | 1.7 | Pass |
| 17 | 1046 | 1320 | 61 | 423 | 426 | OK | 4.3 | 2.1 | Pass |
| 18 | 1126 | 1341 | 35 | 431 | 434 | OK | 5.3 | 1.9 | Pass |
| 19 | 996 | 1247 | 64 | 412 | 417 | OK | 4.6 | 1.6 | Pass |
| 20 | 924 | 1258 | 65 | 401 | 408 | OK | 3.7 | 0.8 | Pass |
| 21 | 1074 | 1350 | 58 | 436 | 426 | OK | 2.1 | 0.5 | Pass |
| 22 | 1038 | 1319 | 57 | 428 | 434 | OK | 5.5 | 0.9 | Pass |
| 23 | 1034 | 1269 | 62 | 413 | 400 | OK | 5.0 | 1.5 | Pass |
| 24 | 977 | 1172 | 60 | 382 | 391 | OK | 4.3 | 1.2 | Pass |
| 25 | 950 | 1129 | 61 | 363 | 374 | OK | 5.1 | 1.3 | Pass |
| 26 | 929 | 1134 | 62 | 375 | 382 | OK | 4.4 | 1.1 | Pass |
| 27 | 1124 | 1278 | 38 | 415 | 400 | OK | 5.6 | 1.7 | Pass |
| 28 | 926 | 1221 | 47 | 401 | 400 | OK | 5.1 | 1.2 | Pass |
| 29 | 1050 | 1299 | 39 | 428 | 417 | OK | 3.7 | 2.0 | Pass |
| 30 | 983 | 1289 | 53 | 409 | 400 | OK | 4.3 | 1.2 | Pass |
| 31 | 1105 | 1299 | 37 | 416 | 426 | OK | 4.4 | 0.9 | Pass |
| 32 | 938 | 1249 | 38 | 399 | 400 | OK | 4.9 | 1.6 | Pass |
| 33 | 1151 | 1347 | 50 | 437 | 434 | OK | 4.9 | 1.3 | Pass |
| 34 | 1014 | 1253 | 49 | 407 | 391 | OK | 5.5 | 2.1 | Pass |
| 35 | 1029 | 1280 | 39 | 419 | 417 | OK | 4.7 | 0.7 | Pass |
| 36 | 1151 | 1331 | 38 | 423 | 426 | OK | 5.1 | 1.4 | Pass |

TABLE 10

| No. | Class | Welding Wire | Steel Plate | Chemical Composition of Weld Metal of Welded Joint (mass %) (Note 1) | | | | | | | |
|---|---|---|---|---|---|---|---|---|---|---|---|
| | | | | C | Si | Mn | P | S | Al | Ti | Ni |
| 37 | Inv. ex. | W37 | S1 | 0.14 | 0.35 | 1.8 | 0.010 | 0.007 | 0.025 | 0.120 | 1.3 |
| 38 | Inv. ex. | W38 | S1 | 0.13 | 0.26 | 1.6 | 0.009 | 0.009 | 0.034 | 0.115 | 1.4 |
| 39 | Inv. ex. | W39 | S1 | 0.15 | 0.30 | 1.5 | 0.010 | 0.008 | 0.020 | 0.132 | 2.2 |
| 40 | Inv. ex. | W40 | S2 | 0.13 | 0.72 | 2.5 | 0.012 | 0.007 | 0.023 | 0.009 | 1.2 |
| 41 | Inv. ex. | W41 | S2 | 0.10 | 0.64 | 2.1 | 0.010 | 0.007 | 0.028 | 0.026 | 1.3 |
| 42 | Inv. ex. | W42 | S2 | 0.11 | 0.88 | 2.0 | 0.011 | 0.007 | 0.032 | 0.047 | 1.0 |
| 43 | Inv. ex. | W43 | S3 | 0.18 | 0.21 | 1.2 | 0.008 | 0.005 | 0.038 | 0.124 | 1.4 |
| 44 | Inv. ex. | W44 | S3 | 0.17 | 0.22 | 1.4 | 0.014 | 0.005 | 0.040 | 0.117 | 1.3 |
| 45 | Inv. ex. | W45 | S3 | 0.18 | 0.32 | 1.5 | 0.014 | 0.006 | 0.022 | 0.102 | 1.5 |
| 46 | Inv. ex. | W46 | S4 | 0.17 | 0.24 | 1.7 | 0.012 | 0.003 | 0.024 | 0.045 | 2.2 |
| 47 | Inv. ex. | W47 | S4 | 0.16 | 0.33 | 1.6 | 0.013 | 0.008 | 0.015 | 0.017 | 3.2 |
| 48 | Inv. ex. | W48 | S4 | 0.21 | 0.35 | 1.9 | 0.013 | 0.003 | 0.020 | 0.012 | 3.0 |
| 49 | Inv. ex. | W49 | S5 | 0.12 | 0.31 | 1.4 | 0.008 | 0.003 | 0.040 | 0.027 | 2.5 |
| 50 | Inv. ex. | W50 | S5 | 0.10 | 0.27 | 1.8 | 0.013 | 0.007 | 0.019 | 0.022 | 2.0 |
| 51 | Inv. ex. | W51 | S5 | 0.11 | 0.30 | 1.7 | 0.014 | 0.008 | 0.023 | 0.018 | 2.2 |
| 52 | Inv. ex. | W52 | S6 | 0.12 | 0.54 | 1.5 | 0.012 | 0.003 | 0.029 | 0.020 | 1.5 |
| 53 | Inv. ex. | W53 | S6 | 0.11 | 0.49 | 1.7 | 0.012 | 0.005 | 0.008 | 0.024 | 1.4 |
| 54 | Inv. ex. | W54 | S6 | 0.12 | 0.58 | 1.7 | 0.013 | 0.009 | 0.036 | 0.008 | 1.5 |
| 55 | Inv. ex. | W55 | S7 | 0.12 | 0.24 | 1.6 | 0.014 | 0.009 | 0.055 | 0.047 | 3.2 |
| 56 | Inv. ex. | W56 | S7 | 0.14 | 0.22 | 1.9 | 0.012 | 0.008 | 0.049 | 0.010 | 3.1 |
| 57 | Inv. ex. | W57 | S7 | 0.14 | 0.19 | 1.8 | 0.013 | 0.003 | 0.068 | 0.035 | 3.4 |
| 58 | Inv. ex. | W58 | S8 | 0.12 | 0.24 | 1.8 | 0.008 | 0.008 | 0.005 | 0.110 | 2.1 |
| 59 | Inv. ex. | W59 | S8 | 0.13 | 0.31 | 1.8 | 0.014 | 0.005 | 0.008 | 0.107 | 2.1 |
| 60 | Inv. ex. | W60 | S8 | 0.11 | 0.29 | 1.7 | 0.009 | 0.007 | 0.007 | 0.097 | 2.5 |
| 61 | Inv. ex. | W61 | S9 | 0.11 | 0.44 | 2.1 | 0.011 | 0.009 | 0.032 | 0.034 | 3.3 |
| 62 | Inv. ex. | W62 | S9 | 0.10 | 0.48 | 1.9 | 0.009 | 0.009 | 0.028 | 0.021 | 3.4 |
| 63 | Inv. ex. | W63 | S9 | 0.12 | 0.57 | 1.9 | 0.014 | 0.008 | 0.010 | 0.027 | 3.6 |
| 64 | Inv. ex. | W64 | S10 | 0.12 | 0.34 | 1.6 | 0.012 | 0.007 | 0.038 | 0.047 | 1.6 |
| 65 | Inv. ex. | W65 | S10 | 0.13 | 0.36 | 1.6 | 0.008 | 0.008 | 0.035 | 0.011 | 1.1 |
| 66 | Inv. ex. | W66 | S10 | 0.13 | 0.35 | 1.4 | 0.008 | 0.009 | 0.020 | 0.029 | 1.4 |
| 67 | Inv. ex. | W67 | S11 | 0.11 | 0.27 | 1.8 | 0.011 | 0.009 | 0.035 | 0.031 | 5.2 |
| 68 | Inv. ex. | W68 | S11 | 0.14 | 0.33 | 2.1 | 0.011 | 0.005 | 0.028 | 0.027 | 4.8 |
| 69 | Inv. ex. | W69 | S11 | 0.13 | 0.34 | 2.0 | 0.012 | 0.006 | 0.019 | 0.042 | 5.5 |
| 70 | Inv. ex. | W70 | S12 | 0.15 | 0.29 | 1.9 | 0.012 | 0.008 | 0.024 | 0.020 | 1.5 |
| 71 | Inv. ex. | W71 | S12 | 0.16 | 0.25 | 1.9 | 0.012 | 0.006 | 0.033 | 0.015 | 8.8 |
| 72 | Inv. ex. | W72 | S12 | 0.14 | 0.33 | 1.8 | 0.009 | 0.007 | 0.032 | 0.005 | 3.4 |

TABLE 10-continued

| | | | | | | | | | | |
|---|---|---|---|---|---|---|---|---|---|---|
| 73 | Inv. ex. | W73 | S13 | 0.14 | 0.31 | 0.9 | 0.012 | 0.006 | 0.018 | 0.112 | 3.5 |
| 74 | Inv. ex. | W74 | S13 | 0.16 | 0.54 | 1.8 | 0.012 | 0.008 | 0.032 | 0.030 | 2.7 |
| 75 | Inv. ex. | W75 | S13 | 0.12 | 0.38 | 1.0 | 0.012 | 0.006 | 0.018 | 0.107 | 3.8 |
| 76 | Inv. ex. | W76 | S13 | 0.16 | 0.58 | 1.7 | 0.009 | 0.007 | 0.040 | 0.031 | 2.8 |

Chemical Composition of Weld Metal of Welded Joint (mass %) (Note 1)

| No. | Cr | Mo | V | Nb | Cu | B | N | O | Ceq [mass %] | Y-value [mass %] |
|---|---|---|---|---|---|---|---|---|---|---|
| 37 | | | | | | | 0.058 | 0.034 | 0.49 | 0.199 |
| 38 | 0.3 | | | | 0.13 | | 0.045 | 0.018 | 0.50 | 0.196 |
| 39 | | 0.2 | | | | | 0.038 | 0.042 | 0.52 | 0.197 |
| 40 | | | | 0.004 | 0.15 | 0.0002 | 0.058 | 0.040 | 0.61 | 0.113 |
| 41 | | | 0.05 | 0.006 | 0.12 | 0.0003 | 0.054 | 0.049 | 0.51 | 0.123 |
| 42 | | | | 0.004 | 0.12 | 0.0002 | 0.031 | 0.046 | 0.51 | 0.151 |
| 43 | 0.3 | 0.6 | 0.04 | | | | 0.057 | 0.031 | 0.64 | 0.197 |
| 44 | 0.1 | 0.8 | 0.04 | | 0.18 | | 0.051 | 0.044 | 0.67 | 0.198 |
| 45 | 0.2 | 0.5 | 0.07 | | 0.16 | | 0.039 | 0.030 | 0.65 | 0.170 |
| 46 | | 0.4 | 0.09 | | 0.15 | 0.0022 | 0.045 | 0.048 | 0.62 | 0.118 |
| 47 | | 0.4 | 0.09 | | | | 0.054 | 0.036 | 0.63 | 0.080 |
| 48 | | 0.3 | 0.08 | | 0.11 | | 0.058 | 0.044 | 0.70 | 0.088 |
| 49 | | 0.3 | | | 0.13 | 0.0015 | 0.057 | 0.037 | 0.50 | 0.110 |
| 50 | 0.2 | 0.2 | | 0.012 | | 0.0023 | 0.057 | 0.020 | 0.55 | 0.093 |
| 51 | | 0.3 | | | | | 0.029 | 0.042 | 0.54 | 0.091 |
| 52 | | | 0.02 | | | | 0.042 | 0.026 | 0.43 | 0.100 |
| 53 | | | 0.01 | | 0.17 | | 0.050 | 0.046 | 0.45 | 0.087 |
| 54 | | | 0.02 | | 0.15 | | 0.038 | 0.027 | 0.47 | 0.101 |
| 55 | 0.4 | 0.2 | | 0.014 | 0.18 | 0.0010 | 0.038 | 0.035 | 0.61 | 0.148 |
| 56 | 0.2 | 0.3 | | 0.022 | 0.19 | 0.0008 | 0.038 | 0.042 | 0.66 | 0.112 |
| 57 | 0.3 | 0.2 | | 0.024 | 0.18 | 0.0013 | 0.054 | 0.028 | 0.64 | 0.153 |
| 58 | | 0.1 | | | 0.09 | | 0.031 | 0.031 | 0.51 | 0.166 |
| 59 | | 0.1 | | | | | 0.035 | 0.022 | 0.52 | 0.168 |
| 60 | | 0.3 | | | 0.10 | | 0.046 | 0.020 | 0.54 | 0.154 |
| 61 | 1.4 | | | 0.043 | 0.46 | | 0.029 | 0.033 | 0.84 | 0.130 |
| 62 | 1.0 | 0.3 | | 0.052 | 0.75 | | 0.057 | 0.046 | 0.80 | 0.109 |
| 63 | 1.1 | | | 0.084 | 0.42 | | 0.038 | 0.030 | 0.77 | 0.099 |
| 64 | | | 0.17 | | | 0.0020 | 0.029 | 0.037 | 0.45 | 0.134 |
| 65 | | | 0.08 | 0.015 | | 0.0015 | 0.045 | 0.021 | 0.44 | 0.095 |
| 66 | 0.3 | | 0.12 | | | 0.0019 | 0.058 | 0.034 | 0.48 | 0.093 |
| 67 | | 0.6 | | | 0.17 | 0.0035 | 0.044 | 0.032 | 0.70 | 0.118 |
| 68 | | 0.8 | | | 0.17 | 0.0044 | 0.043 | 0.030 | 0.82 | 0.116 |
| 69 | | 0.8 | 0.04 | | | 0.0034 | 0.032 | 0.033 | 0.82 | 0.120 |
| 70 | 0.6 | 1.4 | | | 0.15 | | 0.056 | 0.050 | 0.99 | 0.099 |
| 71 | 0.2 | 0.9 | | | 0.13 | | 0.049 | 0.048 | 0.97 | 0.102 |
| 72 | 1.0 | 1.0 | | | | | 0.040 | 0.032 | 0.99 | 0.090 |
| 73 | 0.3 | 0.8 | | 0.008 | 0.23 | 0.0010 | 0.032 | 0.021 | 0.65 | 0.160 |
| 74 | | 0.4 | 0.04 | | 0.10 | | 0.056 | 0.038 | 0.65 | 0.121 |
| 75 | | 1.0 | | 0.060 | | 0.0057 | 0.049 | 0.022 | 0.65 | 0.160 |
| 76 | 1.2 | | 0.16 | | 0.58 | | 0.040 | 0.039 | 0.79 | 0.128 |

(Note 1):
Balance is Fe and unavoidable impurities

TABLE 11

(Rest of Table 10)

| | Mechanical Properties of Welded Joint | | | Hardness of Weld Metal | | | Cross-Sectional Shape of Welded Joint | | |
|---|---|---|---|---|---|---|---|---|---|
| No. | Yield Strength [MPa] | Tensile Strength [MPa] | vE-40 [J/cm$^2$] | Vickers Hardness [Hv] | (eq. 4) Martensite Hardness [Hv] | Martensite Judgment | W1 [mm] | W2 [mm] | Total Judgment |
| 37 | 1090 | 1237 | 31 | 405 | 417 | OK | 5.7 | 1.5 | Pass |
| 38 | 1009 | 1213 | 34 | 395 | 408 | OK | 5.3 | 1.2 | Pass |
| 39 | 1108 | 1382 | 28 | 443 | 426 | OK | 5.3 | 1.8 | Pass |
| 40 | 1075 | 1259 | 47 | 398 | 408 | OK | 3.8 | 0.8 | Pass |
| 41 | 1056 | 1245 | 52 | 399 | 382 | OK | 4.1 | 1.0 | Pass |
| 42 | 1000 | 1161 | 55 | 380 | 391 | OK | 5.1 | 1.6 | Pass |
| 43 | 1199 | 1387 | 28 | 456 | 452 | OK | 4.9 | 1.8 | Pass |
| 44 | 1193 | 1390 | 27 | 456 | 443 | OK | 4.2 | 1.9 | Pass |
| 45 | 1124 | 1314 | 42 | 434 | 452 | OK | 3.6 | 1.5 | Pass |
| 46 | 1203 | 1406 | 43 | 458 | 443 | OK | 5.0 | 1.6 | Pass |
| 47 | 999 | 1272 | 33 | 415 | 434 | OK | 3.7 | 1.1 | Pass |
| 48 | 1215 | 1406 | 32 | 459 | 477 | OK | 5.0 | 0.8 | Pass |

TABLE 11-continued (Rest of Table 10)

| | Mechanical Properties of Welded Joint | | | Hardness of Weld Metal | | | Cross-Sectional Shape of Welded Joint | | |
|---|---|---|---|---|---|---|---|---|---|
| No. | Yield Strength [MPa] | Tensile Strength [MPa] | vE-40 [J/cm²] | Vickers Hardness [Hv] | (eq. 4) Martensite Hardness [Hv] | Martensite Judgment | W1 [mm] | W2 [mm] | Total Judgment |
| 49 | 921 | 1214 | 46 | 395 | 400 | OK | 3.9 | 0.8 | Pass |
| 50 | 913 | 1138 | 40 | 370 | 382 | OK | 5.6 | 1.5 | Pass |
| 51 | 947 | 1216 | 36 | 402 | 391 | OK | 4.6 | 1.0 | Pass |
| 52 | 1046 | 1191 | 42 | 386 | 400 | OK | 4.8 | 1.8 | Pass |
| 53 | 1102 | 1258 | 34 | 408 | 391 | OK | 4.5 | 2.1 | Pass |
| 54 | 988 | 1220 | 41 | 398 | 400 | OK | 2.2 | 0.6 | Pass |
| 55 | 905 | 1202 | 55 | 393 | 400 | OK | 4.6 | 1.8 | Pass |
| 56 | 1045 | 1256 | 45 | 410 | 417 | OK | 3.7 | 1.3 | Pass |
| 57 | 1088 | 1329 | 49 | 434 | 417 | OK | 5.1 | 1.2 | Pass |
| 58 | 1094 | 1254 | 46 | 412 | 400 | OK | 5.7 | 1.1 | Pass |
| 59 | 1037 | 1220 | 47 | 401 | 408 | OK | 4.8 | 1.7 | Pass |
| 60 | 1061 | 1240 | 53 | 401 | 391 | OK | 3.8 | 0.9 | Pass |
| 61 | 874 | 1167 | 56 | 378 | 391 | OK | 4.9 | 0.9 | Pass |
| 62 | 994 | 1231 | 44 | 394 | 382 | OK | 3.8 | 1.9 | Pass |
| 63 | 1069 | 1309 | 39 | 416 | 400 | OK | 3.8 | 0.9 | Pass |
| 64 | 976 | 1222 | 57 | 399 | 400 | OK | 4.7 | 0.8 | Pass |
| 65 | 971 | 1202 | 38 | 397 | 408 | OK | 4.7 | 1.5 | Pass |
| 66 | 1032 | 1224 | 39 | 389 | 408 | OK | 5.2 | 1.4 | Pass |
| 67 | 968 | 1168 | 52 | 375 | 391 | OK | 4.4 | 1.5 | Pass |
| 68 | 1116 | 1281 | 46 | 410 | 417 | OK | 5.8 | 1.0 | Pass |
| 69 | 1151 | 1310 | 48 | 425 | 408 | OK | 5.5 | 1.1 | Pass |
| 70 | 1054 | 1263 | 38 | 415 | 426 | OK | 5.4 | 1.2 | Pass |
| 71 | 1054 | 1366 | 39 | 440 | 434 | OK | 3.8 | 1.7 | Pass |
| 72 | 1006 | 1248 | 37 | 401 | 417 | OK | 6.8 | 2.4 | Pass |
| 73 | 1110 | 1267 | 52 | 415 | 417 | OK | 4.8 | 0.8 | Pass |
| 74 | 1154 | 1362 | 45 | 432 | 434 | OK | 5.2 | 1.1 | Pass |
| 75 | 1122 | 1244 | 48 | 404 | 400 | OK | 4.1 | 0.9 | Pass |
| 76 | 1204 | 1411 | 42 | 442 | 434 | OK | 4.5 | 1.3 | Pass |

TABLE 12

| No. | Class | Welding Wire | Steel Plate | Chemical Composition of Weld Metal of Welded Joint (mass %) (Note 1) | | | | | | | |
|---|---|---|---|---|---|---|---|---|---|---|---|
| | | | | C | Si | Mn | P | S | Al | Ti | Ni |
| 77 | Comp. ex. | W77 | S9 | 0.08 | 0.68 | 2.3 | 0.006 | 0.005 | 0.036 | 0.007 | 3.5 |
| 78 | Comp. ex. | W78 | S4 | 0.25 | 0.23 | 1.5 | 0.012 | 0.006 | 0.028 | 0.017 | 1.2 |
| 79 | Comp. ex. | W79 | S4 | 0.19 | 0.10 | 1.8 | 0.014 | 0.011 | 0.035 | 0.013 | 2.7 |
| 80 | Comp. ex. | W80 | S2 | 0.17 | 1.10 | 1.8 | 0.007 | 0.003 | 0.035 | 0.024 | 1.3 |
| 81 | Comp. ex. | W81 | S3 | 0.12 | 0.24 | 0.4 | 0.006 | 0.007 | 0.040 | 0.143 | 1.2 |
| 82 | Comp. ex. | W82 | S2 | 0.18 | 0.95 | 2.6 | 0.012 | 0.007 | 0.016 | 0.043 | 1.5 |
| 83 | Comp. ex. | W83 | S1 | 0.10 | 0.41 | 1.6 | 0.021 | 0.003 | 0.006 | 0.135 | 1.1 |
| 84 | Comp. ex. | W84 | S11 | 0.16 | 0.35 | 1.9 | 0.006 | 0.021 | 0.042 | 0.015 | 5.9 |
| 85 | Comp. ex. | W85 | S8 | 0.18 | 0.30 | 1.9 | 0.006 | 0.004 | 0.003 | 0.127 | 1.5 |
| 86 | Comp. ex. | W86 | S7 | 0.10 | 0.19 | 1.4 | 0.013 | 0.011 | 0.084 | 0.014 | 1.4 |
| 87 | Comp. ex. | W87 | S9 | 0.15 | 0.28 | 2.2 | 0.013 | 0.007 | 0.041 | 0.004 | 3.5 |
| 88 | Comp. ex. | W88 | S1 | 0.14 | 0.21 | 0.7 | 0.006 | 0.007 | 0.003 | 0.172 | 1.5 |
| 89 | Comp. ex. | W89 | S6 | 0.15 | 0.35 | 1.8 | 0.009 | 0.009 | 0.018 | 0.014 | 0.7 |
| 90 | Comp. ex. | W90 | S12 | 0.17 | 0.18 | 1.7 | 0.010 | 0.009 | 0.043 | 0.011 | 9.3 |
| 91 | Comp. ex. | W91 | S9 | 0.16 | 0.48 | 2.1 | 0.008 | 0.008 | 0.030 | 0.014 | 1.3 |
| 92 | Comp. ex. | W92 | S12 | 0.13 | 0.15 | 1.5 | 0.010 | 0.007 | 0.024 | 0.016 | 4.2 |
| 93 | Comp. ex. | W93 | S10 | 0.16 | 0.45 | 1.3 | 0.014 | 0.005 | 0.008 | 0.036 | 1.2 |
| 94 | Comp. ex. | W94 | S9 | 0.16 | 0.58 | 1.9 | 0.008 | 0.010 | 0.017 | 0.019 | 3.2 |
| 95 | Comp. ex. | W95 | S9 | 0.11 | 0.38 | 2.1 | 0.012 | 0.011 | 0.020 | 0.019 | 2.3 |
| 96 | Comp. ex. | W96 | S11 | 0.10 | 0.16 | 2.2 | 0.010 | 0.011 | 0.045 | 0.008 | 5.6 |
| 97 | Comp. ex. | W97 | S7 | 0.13 | 0.15 | 1.8 | 0.010 | 0.004 | 0.053 | 0.012 | 2.4 |
| 98 | Comp. ex. | W98 | S5 | 0.11 | 0.24 | 1.6 | 0.009 | 0.008 | 0.041 | 0.017 | 1.3 |
| 99 | Comp. ex. | W99 | S6 | 0.12 | 0.32 | 1.7 | 0.011 | 0.005 | 0.028 | 0.018 | 2.3 |
| 100 | Comp. ex. | W100 | S6 | 0.13 | 0.30 | 1.6 | 0.008 | 0.006 | 0.017 | 0.016 | 2.5 |
| 101 | Comp. ex. | W101 | S5 | 0.10 | 0.24 | 1.0 | 0.008 | 0.006 | 0.042 | 0.015 | 1.2 |
| 102 | Comp. ex. | W102 | S4 | 0.24 | 0.12 | 2.1 | 0.011 | 0.004 | 0.031 | 0.008 | 2.3 |
| 103 | Comp. ex. | W103 | S9 | 0.11 | 0.22 | 1.8 | 0.009 | 0.005 | 0.012 | 0.005 | 2.5 |
| 104 | Comp. ex. | W104 | S1 | 0.14 | 0.18 | 1.6 | 0.013 | 0.005 | 0.038 | 0.142 | 1.3 |
| 105 | Comp. ex. | W105 | S13 | Not evaluated because of welding defect | | | | | | | |
| 106 | Comp. ex. | W106 | S13 | 0.12 | 0.22 | 1.2 | 0.010 | 0.005 | 0.028 | 0.007 | 1.2 |
| 107 | Comp. ex. | W107 | S13 | 0.14 | 0.25 | 1.6 | 0.007 | 0.006 | 0.022 | 0.035 | 1.4 |
| 108 | Comp. ex. | W108 | S13 | Not evaluated because of welding defect | | | | | | | |

TABLE 12-continued

Chemical Composition of Weld Metal of Welded Joint (mass %) (Note 1)

| No. | Cr | Mo | V | Nb | Cu | B | N | O | Ceq [mass %] | Y-value [mass %] |
|---|---|---|---|---|---|---|---|---|---|---|
| 77 | 1.2 | | | 0.035 | 0.42 | | 0.059 | 0.021 | 0.82 | 0.118 |
| 78 | | 0.5 | 0.04 | | 0.13 | | 0.044 | 0.024 | 0.67 | 0.088 |
| 79 | | 0.2 | 0.03 | | | | 0.062 | 0.019 | 0.61 | 0.096 |
| 80 | | | | 0.005 | 0.15 | 0.0003 | 0.066 | 0.020 | 0.55 | 0.132 |
| 81 | 0.4 | 0.5 | 0.05 | | | | 0.066 | 0.019 | 0.44 | 0.199 |
| 82 | | | | 0.005 | 0.13 | 0.0003 | 0.048 | 0.016 | 0.69 | 0.148 |
| 83 | | | | | | | 0.056 | 0.021 | 0.41 | 0.191 |
| 84 | | 0.2 | | | 0.15 | 0.0028 | 0.039 | 0.016 | 0.69 | 0.113 |
| 85 | | 0.4 | | | | | 0.037 | 0.018 | 0.65 | 0.185 |
| 86 | 0.5 | 0.2 | 0.13 | 0.022 | 0.15 | 0.0008 | 0.037 | 0.015 | 0.54 | 0.138 |
| 87 | 1.3 | | | 0.043 | 0.50 | | 0.036 | 0.021 | 0.88 | 0.107 |
| 88 | | 0.2 | | | | | 0.037 | 0.018 | 0.35 | 0.198 |
| 89 | | | 0.15 | | 0.16 | | 0.053 | 0.024 | 0.49 | 0.086 |
| 90 | 0.4 | 0.8 | | | | | 0.056 | 0.014 | 0.97 | 0.101 |
| 91 | 2.1 | | | 0.051 | 0.48 | | 0.065 | 0.016 | 0.98 | 0.109 |
| 92 | 0.4 | 1.6 | | | | | 0.056 | 0.022 | 0.97 | 0.081 |
| 93 | | | 0.22 | | | 0.0016 | 0.043 | 0.018 | 0.44 | 0.088 |
| 94 | 1.0 | | | 0.105 | 0.45 | | 0.030 | 0.017 | 0.78 | 0.098 |
| 95 | 1.2 | | 0.04 | 0.033 | 1.04 | | 0.056 | 0.014 | 0.78 | 0.101 |
| 96 | | 0.3 | | | | 0.0105 | 0.064 | 0.021 | 0.69 | 0.112 |
| 97 | 0.5 | 0.1 | 0.02 | 0.012 | 0.16 | 0.0005 | 0.041 | 0.003 | 0.62 | 0.114 |
| 98 | | 0.3 | | | | | 0.052 | 0.063 | 0.49 | 0.104 |
| 99 | 0.3 | | 0.00 | | 0.19 | | 0.045 | 0.002 | 0.53 | 0.097 |
| 100 | | 0.2 | 0.00 | | 0.16 | | 0.055 | 0.059 | 0.52 | 0.081 |
| 101 | | 0.3 | | | | | 0.057 | 0.042 | 0.38 | 0.088 |
| 102 | 0.8 | 0.8 | 0.03 | | | | 0.035 | 0.032 | 1.01 | 0.095 |
| 103 | 1.2 | | | 0.07 | 0.42 | | 0.043 | 0.039 | 0.72 | 0.068 |
| 104 | | | | | | | 0.057 | 0.035 | 0.45 | 0.225 |
| 105 | | | | Not evaluated because of welding defect | | | | | | |
| 106 | 0.5 | 0.2 | 0.03 | | | | 0.035 | 0.032 | 0.51 | 0.071 |
| 107 | 0.8 | 0.5 | | | 0.21 | 0.0005 | 0.043 | 0.039 | 0.74 | 0.103 |
| 108 | | | | Not evaluated because of welding defect | | | | | | |

(Note 1):
Balance is Fe and unavoidable impurities

TABLE 13

(Rest of Table 12)

| | Mechanical Properties of Welded Joint | | | Hardness of Weld Metal | | | Cross-Sectional Shape of Welded Joint | | |
|---|---|---|---|---|---|---|---|---|---|
| | Yield | Tensile | | Vickers | (eq. 4) | | | | |
| No. | Strength [MPa] | Strength [MPa] | vE-40 [J/cm²] | Hardness [Hv] | Martensite Hardness [Hv] | Martensite Judgment | W1 [mm] | W2 [mm] | Total Judgment |
| 77 | 968 | 1087 | 63 | 365 | 365 | OK | 4.1 | 1.0 | Reject: Poor Strength |
| 78 | 1274 | 1541 | 25 | 494 | 511 | OK | 4.5 | 1.5 | Reject: Poor Toughness |
| 79 | 1173 | 1369 | 23 | 451 | 460 | OK | 3.9 | 1.3 | Reject: Poor Toughness |
| 80 | 1108 | 1364 | 24 | 440 | 443 | OK | 3.9 | 1.3 | Reject: Poor Toughness |
| 81 | 987 | 1214 | 17 | 396 | 400 | OK | 5.7 | 2.1 | Reject: Poor Toughness |
| 82 | 1189 | 1436 | 15 | 457 | 452 | OK | 4.0 | 1.0 | Reject: Poor Toughness |
| 83 | 965 | 1179 | 18 | 385 | 382 | OK | 3.6 | 1.1 | Reject: Poor Toughness |
| 84 | 1155 | 1347 | 24 | 434 | 434 | OK | 4.7 | 0.7 | Reject: Poor Toughness |
| 85 | 1108 | 1388 | 12 | 442 | 452 | OK | 4.9 | 1.5 | Reject: Poor Toughness |
| 86 | 955 | 1225 | 25 | 391 | 382 | OK | 3.7 | 1.3 | Reject: Poor Toughness |
| 87 | 1069 | 1306 | 16 | 430 | 426 | OK | 4.8 | 1.2 | Reject: Poor Toughness |
| 88 | 1109 | 1260 | 19 | 412 | 417 | OK | 5.2 | 1.7 | Reject: Poor Toughness |
| 89 | 1032 | 1311 | 26 | 420 | 426 | OK | 5.0 | 1.7 | Reject: Poor Strength |
| 90 | 1112 | 1366 | 25 | 442 | 443 | OK | 4.2 | 1.1 | Reject: Poor Toughness |
| 91 | 1018 | 1297 | 13 | 419 | 434 | OK | 3.8 | 1.9 | Reject: Poor Toughness |
| 92 | 1042 | 1262 | 15 | 409 | 408 | OK | 5.3 | 1.4 | Reject: Poor Toughness |
| 93 | 1251 | 1426 | 25 | 452 | 434 | OK | 3.6 | 2.0 | Reject: Poor Toughness |
| 94 | 1049 | 1295 | 9 | 417 | 434 | OK | 4.6 | 0.7 | Reject: Poor Toughness |
| 95 | 1077 | 1229 | 12 | 404 | 391 | OK | 5.6 | 2.1 | Reject: Poor Toughness |
| 96 | 1014 | 1213 | 15 | 387 | 382 | OK | 4.0 | 1.0 | Reject: Poor Toughness |
| 97 | 1000 | 1288 | 26 | 408 | 408 | OK | 4.1 | 0.9 | Reject: Poor Toughness |
| 98 | 954 | 1226 | 24 | 395 | 391 | OK | 3.6 | 1.3 | Reject: Poor Toughness |
| 99 | 995 | 1263 | 25 | 400 | 400 | OK | 4.0 | 1.8 | Reject: Poor Toughness |
| 100 | 963 | 1212 | 25 | 387 | 408 | OK | 4.5 | 1.4 | Reject: Poor Toughness |

TABLE 13-continued (Rest of Table 12)

| | Mechanical Properties of Welded Joint | | | Hardness of Weld Metal | | | Cross-Sectional Shape of Welded Joint | | |
|---|---|---|---|---|---|---|---|---|---|
| | Yield | Tensile | | Vickers | (eq. 4) | | | | |
| No. | Strength [MPa] | Strength [MPa] | vE-40 [J/cm²] | Hardness [Hv] | Martensite Hardness [Hv] | Martensite Judgment | W1 [mm] | W2 [mm] | Total Judgment |
| 101 | 878 | 1032 | 42 | 321 | 382 | NG | 5.6 | 1.0 | Reject: Poor Strength |
| 102 | 1360 | 1512 | 25 | 492 | 502 | OK | 4.8 | 2.0 | Reject: Poor Toughness |
| 103 | 1076 | 1264 | 26 | 406 | 391 | OK | 4.5 | 1.9 | Reject: Poor Toughness |
| 104 | 1101 | 1329 | 25 | 426 | 417 | OK | 4.7 | 2.1 | Reject: Poor Toughness |
| 105 | Not evaluated because of welding defect | | | | | | 1.8 | 0.7 | Reject: Welding Defect |
| 106 | 998 | 1152 | 24 | 381 | 400 | OK | 7.8 | 1.9 | Reject: Poor Toughness |
| 107 | 1028 | 1234 | 26 | 394 | 417 | OK | 4.5 | 0.2 | Reject: Poor Toughness |
| 108 | Not evaluated because of welding defect | | | | | | 5.2 | 2.8 | Reject: Welding Defect |

As shown in Tables 8 to 13, the welding joints of Nos. 1 to 76 according to the examples of the invention had the tensile strength of 1100 MPa or more and the absorbed energy in 2 mm V-notch Charpy impact test at −40 degrees C. (vE-40) of 27 J/cm² of more. Further, the obtained weld metal was judged to be the almost full martensite structure.

To the contrary, as shown in Tables 12 and 13, the welding joints of Nos. 77 to 108 according to the compared examples were failed while having the tensile strength of less than 1100 MPa and/or the absorbed energy in 2 mm V-notch Charpy impact test at −40 degrees C. (vE-40) of less than 27 J/cm², since the composition, the Ceq or the Y of each welding joint was not within the scope of the invention.

Example 2

By using the steel plates S1 to S12 as shown in Table 1 and by using a solid wire and a flux-cored wire having the following composition, 103 of welding joints, each having the weld metal penetrating the joint in the thickness direction thereof, were manufactured by carrying out the single-pass welding using the laser hybrid welding, wherein the laser beam (YAG laser) and the gas shielded arc welding are combined, under the following condition.

As the solid wire and the flux-cored wire, a wire including by mass %, C, 0.4% or less; Si: 1.5% or less; Mn: 4.0% or less; P: 0.02% or less; S: 0.02% or less; Al: 0.08% or less, Ti: 0.30% or less; Ni: 12% or less; Cr: 3.0% or less; Mo: 3.0% or less; V: 0.3% or less; Nb: 0.3% or less; Cu: 1.5% or less; and B: 0 to 0.0150%, was used.

When carrying out the gas shielded arc welding, mixed gas involving Ar gas and $O_2$ gas of 2% to 5% or $CO_2$ gas of 5% to 25% was used as the shield gas, the current was 230 A to 270 A, the voltage was 24 V to 28 V, the welding speed was 100 cm/min to 120 cm/min, the heat input was 2.76 kJ/cm to 4.54 kJ/cm, the preheat temperature was 100 degrees C. to 125 degrees C., the output of the used YAG laser was 5 kW to 11 kW. In carrying out the welding, these conditions were selected corresponding to the used steel plate.

The obtained weld metal included, by mass %, C: over 0.09% to 0.24%; Si: 0.2% to 1.0%; Mn: 0.5% to 2.5%; P: 0.02% or less; S: 0.02% or less; Al: 0.004% to 0.08%; Ti: 0.005% to 0.15%; O: 0.005% to 0.05%; and Ni: 1.0% to 9.0%. Further, when the following elements were contained, the weld metal included one or more of: Cr: 0.1% to 2.0%; Mo: 0.1% to 1.5%; V: 0.005% to 0.2%; Nb: 0.005% to 0.1%; Cu: 0.01% to 1.0%; and B: 0.0005% to 0.01%.

The value Y defined by following equation (2) was calculated, based on the composition of the weld metal of the obtained welded joit.

$$Y=([Si]+[Mn])/40+[Al]+[Ti] \qquad (2)$$

Further, the toughness (vE-40) of the welding joint was evaluated, similarly to the welding joint of Nos. 1 to 72. The result is shown in FIG. 3.

In FIG. 3, a vertical axis represents the value of the absorbed energy (vE-40) in 2 mm V-notch Charpy impact test at −40 degrees C., and a horizontal axis represents the value Y defined by above equation (2).

In view of FIG. 3, it can be understood that the vE-40 is 27 J/cm² or more when the value Y is within a range of 0.07% to 0.20%. Further, it can be understood that superior toughness is obtained when the value Y is 0.08% to 0.18%, and more stable and superior toughness is obtained when the value Y is 0.10% to 0.17%.

On the other hand, it can be understood that the vE-40 is insufficient when the value Y is less than 0.08% or more than 0.20%.

The invention claimed is:

1. An ultrahigh-strength welded joint with a tensile strength of 1138 MPa or more and an absorbed energy in a 2 mm V-notch Charpy impact test at −40° C. (vE-40) of 27 J/cm² or more, comprising a steel plate having a plate thickness of 4 mm to 12 mm and including a weld metal with an almost full martensite structure, wherein, in a cross-section of the welded joint in a direction perpendicular to a welding direction, a cross-sectional shape of the weld metal has a width W1 at a surface of the steel plate and a width W2 at a position which is separated from the surface by three-quarters of the plate thickness, the width W1 being 2.0 mm to 7.0 mm and the width W2 being 0.5 mm to 2.4 mm, and wherein the weld metal comprises, by mass %, C: over 0.09% to 0.24%;

Si: 0.2% to 1.0%;

Mn: 0.5% to 2.5%;

P: 0.02% or less;

S: 0.02% or less;

Al: 0.004% to 0.08%;

Ti: 0.005% to 0.15%;

O: 0.005% to 0.05%; and

Ni: 1.0% to 9%, wherein a carbon equivalent (Ceq) as defined by equation (1) is 0.40% to 1.00%, a value Y as defined by equation (2) is 0.07% to 0.20%, and a balance of the weld metal is constituted by unavoidable impurities and Fe:

$$Ceq=[C]+[Si]/24+[Mn]/6+[Ni]/40+[Cr]/5+[Mo]/4+[V]/14 \qquad (1)$$

$$Y=([Si]+[Mn])/40+[Al]+[Ti] \qquad (2), and$$

wherein in equations (1) and (2), elements with "[ ]" represent contents (mass %) of respective elements.

2. The ultrahigh-strength welded joint according to claim 1, wherein the weld metal further comprises, by mass %, one or more of:
Cr: 0.1% to 2.0%;
Mo: 0.1% to 1.5%;
V: 0.005% to 0.2%;
Nb: 0.005% to 0.1%;
Cu: 0.01% to 1.0%; and
B: 0.0005% to 0.01%.

3. An ultrahigh-strength welded joint with a tensile strength of 1100 MPa or more and an absorbed energy in a 2 mm V-notch Charpy impact test at −40° C. (vE-40) of 27 J/cm² or more, comprising a steel plate having a plate thickness of 4 mm to 12 mm and including a weld metal with an almost full martensite structure, wherein, in a cross-section of the welded joint in a direction perpendicular to a welding direction, a cross-sectional shape of the weld metal has a width W1 at a surface of the steel plate and a width W2 at a position which is separated from the surface by three-quarters of the plate thickness, the width W1 being 2.0 mm to 7.0 mm and the width W2 being 0.5 mm to 2.4 mm, and wherein the weld metal comprises, by mass %,
C: over 0.09% to 0.24%;
Si: 0.2% to 1.0%;
Mn: 0.5% to 2.5%;
P: 0.02% or less;
S: 0.02% or less;
Al: 0.004% to 0.08%;
Ti: 0.005% to 0.15%;
O: 0.005% to 0.05%; and
Ni: 1.0% to 9%, wherein a carbon equivalent (Ceq) as defined by equation (1) is 0.40% to 1.00%, a value Y as defined by equation (2) is 0.07% to 0.20%, and a balance of the weld metal is constituted by unavoidable impurities and Fe:

$$Ceq=[C]+[Si]/24+[Mn]/6+[Ni]/40+[Cr]/5+[Mo]/4+[V]/14 \qquad (1)$$

$$Y=([Si]+[Mn])/40+[Al]+[Ti] \qquad (2), and$$

wherein in equations (1) and (2), elements with "[ ]" represent contents (mass %) of respective elements.

4. The ultrahigh-strength welded joint according to claim 3, wherein the weld metal further comprises, by mass %, one or more of:
Cr: 0.1% to 2.0%;
Mo: 0.1% to 1.5%;
V: 0.005% to 0.2%;
Nb: 0.005% to 0.1%;
Cu: 0.01% to 1.0%; and
B: 0.0005% to 0.01%.

5. The ultrahigh-strength welded joint according to claim 1 or 3, wherein the welded joint is obtained by means of single-pass welding using laser hybrid welding.

* * * * *

UNITED STATES PATENT AND TRADEMARK OFFICE
CERTIFICATE OF CORRECTION

PATENT NO. : 8,758,901 B2  
APPLICATION NO. : 13/701869  
DATED : June 24, 2014  
INVENTOR(S) : Shuichi Nakamura et al.

Page 1 of 1

It is certified that error appears in the above-identified patent and that said Letters Patent is hereby corrected as shown below:

In the Specification

Column 4, line 49, change "C, 0.4% or less;" to -- C: 0.4% or less --;

Column 12, line 57, change "to reduce 0 less" to -- to reduce O less --;

Column 12, line 58, change "cost for removing 0" to -- cost for removing O --;

Column 15, line 27, change "wire, C," to -- wire, C: --;

Column 18, line 21, change "containing 0 of 0.005% to 0.05%" to -- containing O of 0.005% to 0.05% --;

Column 18, line 42, change "containing 0 of 0.005% to 0.05%" to -- containing O of 0.0005% to 0.05% --;

Column 41, line 45, change "mass%, C, 0.4% or less;" to -- mass%, C: 0.4% or less; --.

Signed and Sealed this  
Tenth Day of February, 2015

Michelle K. Lee  
*Deputy Director of the United States Patent and Trademark Office*